(12) United States Patent
Masuda

(10) Patent No.: US 8,095,752 B2
(45) Date of Patent: Jan. 10, 2012

(54) STORAGE ACCESS DEVICE ISSUING I/O REQUESTS, IN AN ASSOCIATED LOGICAL UNIT ENVIRONMENT

(75) Inventor: Haruki Masuda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 990 days.

(21) Appl. No.: 12/036,496

(22) Filed: Feb. 25, 2008

(65) Prior Publication Data

US 2009/0106766 A1  Apr. 23, 2009

(30) Foreign Application Priority Data

Oct. 23, 2007  (JP) .................................. 2007-275789

(51) Int. Cl.
*G06F 12/16* (2006.01)
(52) U.S. Cl. ................ 711/162; 711/112; 711/E12.103; 718/104
(58) Field of Classification Search ........................ None
See application file for complete search history.

(56) References Cited

U.S. PATENT DOCUMENTS 7,225,294 B2    5/2007  Nagashima et al.
2006/0236056 A1 * 10/2006  Nagata ........................ 711/165

FOREIGN PATENT DOCUMENTS

JP    2004-264973    9/2004

* cited by examiner

*Primary Examiner* — Hetul Patel
(74) *Attorney, Agent, or Firm* — Antonelli, Terry, Stout & Kraus, LLP.

(57) ABSTRACT

A storage access device, which issues an I/O request (input/output request) to a logical unit provided by one or more storage systems, holds association information showing that a plurality of logical volumes corresponding to a plurality of logical units, which belong to the same copy-set, are associated. In the storage access device, the respective associated logical volumes shown by this association information are allocated to a virtual device, and the virtual device is provided to an application.

8 Claims, 15 Drawing Sheets

FIG. 9

16 LOGICAL VOL MANAGEMENT TABLE

| LOGICAL VOL ID 161 | COPY ID 162 | ACCESS STORAGE INFORMATION 163 | | | | VIRTUAL DEVICE ID 164 | ROLE INFORMA-TION 165 | UPDATE TIME 166 | ACCESS INFORMATION 167 | |
|---|---|---|---|---|---|---|---|---|---|---|
| | | VENDOR NAME 1631 | MODEL NAME 1632 | SERIAL No. 1633 | LUN 1634 | | | | W | R |
| 0001 | 12345 | ABC | XYZ | 0012 | 1 | 0 | P | 123456789 | Y | Y |
| 0002 | 12345 | ABC | XYZ | 0012 | 2 | 0 | S | 123456789 | N | Y |
| 0003 | 12345 | ABC | XYZ | 0020 | 1 | 0 | S | 123456700 | N | Y |
| 0004 | 67890 | ABC | XYZ | 0012 | 3 | 1 | P | 123456890 | Y | N |
| 0005 | 67890 | ABC | XYZ | 0012 | 4 | 1 | S | 123456890 | N | Y |
| 0006 | 54321 | ABC | XYZ | 0020 | 2 | 2 | S | 123456725 | N | Y |
| 0007 | - | ABC | XYZ | 0012 | 5 | - | - | - | - | N |
| 0008 | - | ABC | XYZ | 0012 | 6 | - | - | - | - | - |
| .. | .. | .. | .. | .. | .. | .. | .. | .. | .. | .. |

17 VIRTUAL DEVICE MANAGEMENT TABL

| 171 | 172 | | | | 173 |
|---|---|---|---|---|---|
| | 1721 | 1722 | 1723 | 1724 | |
| VIRTUAL DEVICE ID | PRIMARY INFORMATION | | | | UPDATE TIME |
| | VENDOR NAME | MODEL NAME | SERIAL No. | LUN | |
| 0 | ABC | XYZ | 0012 | 1 | 123456789 |
| 1 | ABC | XYZ | 0012 | 3 | 123456890 |
| 2 | ABC | XYZ | 0030 | 1 | 123456725 |
| : | : | : | : | : | : |

FIG. 19

| DRIVE NAME | ID | ACCESS | LAST UPDATE TIME | LUN | VENDOR | MODEL | SERIAL No. |
|---|---|---|---|---|---|---|---|
| E: | 1 | W/R | 2007-08-09 11:23:45 | 01 | ABC | ZXY | 1234 |
| | | R | 2007-08-09 11:23:45 | 02 | ABC | ZXY | 1234 |
| | | - | 2007-08-09 00:00:01 | 03 | ABC | ZXY | 1234 |
| | | - | 2007-08-02 00:10:01 | 01 | DEF | STR | 0012 |
| F: | 2 | W/R | 2007-08-09 21:45:33 | 04 | ABC | ZXY | 1234 |
| | | R | 2007-08-09 21:45:33 | 05 | ABC | ZXY | 1234 |
| | | - | 2007-08-09 21:45:31 | 06 | ABC | ZXY | 1234 |
| | | - | 2007-08-02 00:10:15 | 02 | DEF | STR | 0012 |
| | | - | 2007-08-01 00:10:15 | 03 | DEF | STR | 0012 |

CHANGE ACCESS

STORAGE ACCESS DEVICE ISSUING I/O REQUESTS, IN AN ASSOCIATED LOGICAL UNIT ENVIRONMENT

CROSS-REFERENCE TO PRIOR APPLICATION

This application relates to and claims the benefit of priority from Japanese Patent Application number 2007-275789, filed on Oct. 23, 2007, the entire disclosure of which is incorporated herein by reference.

BACKGROUND

The present invention relates to computer technology for accessing a storage system.

For some time now, for example, a technique in which data is copied between volumes constituting a copy-pair has been known as one of the techniques employed in a storage system (Japanese Laid-open Patent No. 2004-264973). The copy-pair-based copying technique, for example, is used for making data redundant, or for carrying out a backup. By employing a copy-pair-based copying technique, data stored in the one volume forming the copy-pair is copied to the other volume forming the copy-pair, keeping the data contents of both volumes the same.

Ordinarily, even when a copy-pair is created in a storage system, the plurality of logical volumes, which correspond to the plurality of logical units constituting the copy-pair, are respectively provided in the same way to an application in the host computer, which is accessing the storage system, regardless of the roles (copy-source or copy-destination) of the respective logical units constituting the copy-pair.

SUMMARY

Accordingly, an object of the present invention is to restrict provision to an application of the plurality of logical volumes corresponding to the plurality of logical units constituting the copy-pair.

A storage access device, which issues an I/O request (Input/Output request) to a logical unit provided by one or more storage systems, maintains association information showing that a plurality of logical volumes corresponding to a plurality of logical units, which belong to the same copy-set, are associated. In the storage access device, the respective associated logical volumes described by this association information are allocated to a virtual device, and the virtual device is provided to the application.

BRIEF DESCRIPTION OF THE DRAWINGS

FIG. 9 is a diagram showing an example of a logical VOL management table;

FIG. 19 is a diagram showing an example of a screen, which the virtual device management program provides to the host user.

DETAILED DESCRIPTION OF THE PREFERRED EMBODIMENT

Figure 1:
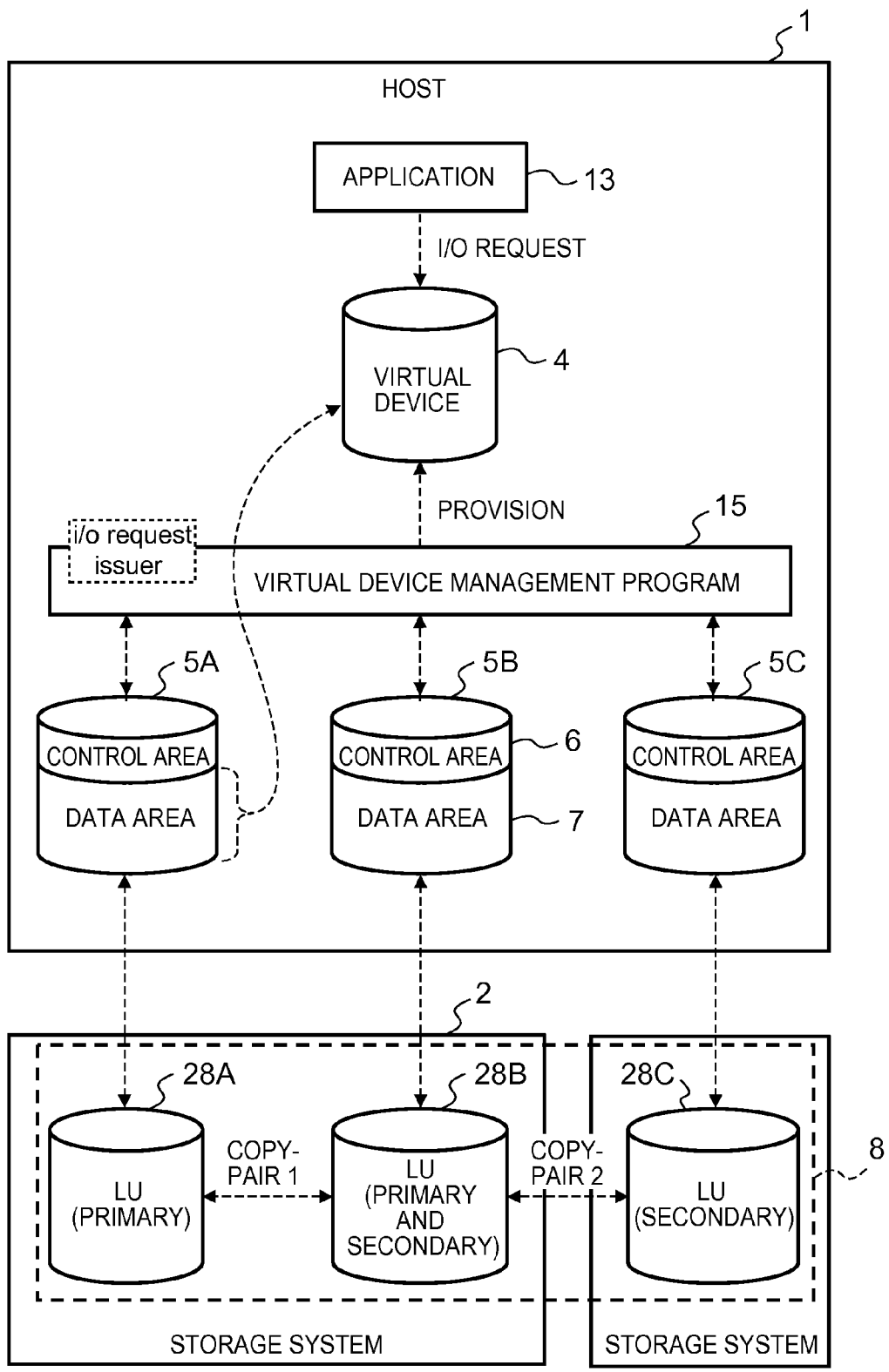
FIG. 1 is a conceptual view illustrating the principal features of a storage access device related to one embodiment of the present invention.

In a first embodiment, a storage access device is a device for issuing an I/O request (Input/Output request) to a logical unit provided by one or more storage systems. The storage access device comprises logical volumes, which correspond to the above-mentioned logical units respectively; a volume manager for managing association information showing that the above-mentioned plurality of logical volumes corresponding to the above-mentioned plurality of logical units, which belong to the same copy-set, are associated; and a virtual device to which each of the above-mentioned associated logical volumes described in the above-mentioned association information are allocated, and to which an application is provided. The application, for example, can be an application program executed by a microprocessor of the storage access device, or an application server connected to the storage access device.

In a second embodiment according to the first embodiment, the above-mentioned volume manager further manages role information showing whether a logical volume corresponds to a primary volume or a secondary volume for each of the above-mentioned logical volumes. The storage access device further comprises a volume virtualization unit, which, based on the above-mentioned association information and the above-mentioned role information, shows to the application as the contents of the above-mentioned virtual device the contents of the logical volume corresponding to the primary volume from among the logical volumes allocated to the above-mentioned virtual device. The above-mentioned primary volume is the logical volume corresponding to a primary logical unit. The above-mentioned secondary volume is the logical volume corresponding to a secondary logical unit. The above-mentioned primary logical unit is the logical unit, which constitutes a copy-source but does not constitute a copy-destination in the above-mentioned copy-set. The above-mentioned secondary logical unit is the logical unit, which constitutes the copy-destination in the above-mentioned copy-set.

In a third embodiment according to either the first or second embodiments, the above-mentioned volume manager further manages role information showing whether a logical volume corresponds to a primary volume or a secondary volume for each of the above-mentioned logical volumes. The storage access device further comprises an I/O request issuer, which, when an I/O indication specifying the above-mentioned virtual device is received from the above-mentioned application, references the association information and the role information managed by the above-mentioned volume manager, selects from among the logical volumes allocated to the above-mentioned virtual device the logical volume corresponding to the primary volume, and issues an I/O request to the logical unit corresponding to the above-mentioned selected logical volume. The above-mentioned primary volume is the logical volume corresponding to a primary logical unit. The above-mentioned secondary volume is the logical volume corresponding to a secondary logical unit. The above-mentioned primary logical unit is the logical unit, which constitutes a copy-source, but does not constitute a copy-destination in the above-mentioned copy-set. The above-mentioned secondary logical unit is the logical unit, which constitutes the copy-destination in the above-mentioned copy-set.

In a fourth embodiment according to any of the first through the third embodiments, the above-mentioned volume manager further manages, for each of the logical volumes, role information showing whether a logical volume corresponds to a primary volume or a secondary volume, and update time information showing the latest point in time at which the above-mentioned storage access device issued a write request to the above-mentioned logical volume. The storage access device further comprises an I/O request issuer, which, when a read indication specifying the above-mentioned virtual device is received from the above-mentioned application, references the association information, role information, and update time information managed by the above-mentioned volume manager, selects from among the logical volumes allocated to the above-mentioned virtual device the logical volume corresponding to the primary volume and the logical volume holding the same update time information as the logical volume corresponding to the above-mentioned primary volume, and issues a read request to at least one of the above-mentioned selected logical volumes. The above-mentioned primary volume is the logical volume corresponding to a primary logical unit. The above-mentioned secondary volume is the logical volume corresponding to a secondary logical unit. The above-mentioned primary logical unit is the logical unit, which constitutes a copy-source, but does not constitute a copy-destination in the above-mentioned copy-set. The above-mentioned secondary logical unit is the logical unit, which constitutes the copy-destination in the above-mentioned copy-set.

In a fifth embodiment according to the fourth embodiment, the above-mentioned logical volume has a control area into which the above-mentioned update time information is written. The storage access device further comprises an update time information updater, which reads out the above-mentioned update time information from the control area of the above-mentioned logical volume, and updates the update time information of the above-mentioned logical volume, which is managed by the above-mentioned volume manager, to the above-mentioned read-out update time information. The above-mentioned I/O request issuer, upon receiving a write indication specifying the above-mentioned virtual device from the above-mentioned application, references the association information and role information managed by the above-mentioned volume manager, selects from among the logical volumes allocated to the above-mentioned virtual device the logical volume corresponding to the primary volume, issues a write request to the above-mentioned selected logical volume, updates the above-mentioned update time information related to the above-mentioned selected logical volume, which is managed by the above-mentioned volume manager, to the update time information showing the point in time at which the write request has been issued to the above-mentioned selected logical volume, and writes the above-mentioned updated update time information to the control area of the above-mentioned selected logical volume.

In a sixth embodiment according to any of the first through the fifth embodiments, the above-mentioned logical volume has a control area in which is written identification information showing the copy-set to which the logical unit corresponding to the above-mentioned logical volume belongs. The storage access device further comprises an identification information writer for writing the above-mentioned identification information to the control area of the above-mentioned logical volume; and an association information creator for reading out the above-mentioned identification information from the control area of the above-mentioned logical volume, and creating association information that treats logical volumes, for which the above-mentioned read-out identification information is the same, as associated logical volumes.

In a seventh embodiment according to the sixth embodiment, the storage access device further comprises a first role information creator, which, subsequent to writing identification information, which differs from any other identification information written to the above-mentioned logical volume, to the control area of one logical volume of the above-mentioned logical volumes, reads out the above-mentioned identification information from the control area of a comparison logical volume, which is the above-mentioned logical volume other than the above-mentioned the one logical volume, and when the identification information written to the above-mentioned the one logical volume matches the above-mentioned read-out identification information, creates the above-mentioned role information, which treats the above-mentioned comparison logical volume as the secondary volume.

In an eighth embodiment according to either the sixth or seventh embodiment, the above-mentioned volume manager further manages logical unit information related to the logical unit corresponding to the above-mentioned logical volume for each of the above-mentioned logical volumes. The storage access device further comprises a logical unit information writer, which references the above-mentioned association information, role information and logical unit information, and writes the logical unit information related to the logical volume, which is the primary volume associated to the above-mentioned logical volume, to the control area of the above-mentioned logical volume; and a second role information creator, which reads out the above-mentioned logical unit information from the control area of the above-mentioned logical volume, and when the logical unit information of the above-mentioned logical volume, which is managed by the above-mentioned volume manager, differs from the above-mentioned read-out logical unit information, creates the above-mentioned role information, which treats the above-mentioned logical volume as the secondary volume.

Two or more arbitrary embodiments of the plurality of the first through the eighth embodiments described above can be combined. At least one of the above-described volume manager, volume virtualization unit, I/O request issuer, update time information updater, identification information writer, association information creator, first role information creator, and second role information creator can be made from hardware, a computer program, or a combination thereof (for example, one part can be realized via a computer program, and the remainder realized via hardware). The computer program is read into and executed by a prescribed processor. Further, a storage region that exists in a hardware resource, such as a memory, can be used as needed during information processing, which is carried out by the computer program being read into the processor. Further, the computer program can be installed in a computer from a CD-ROM or other such recording medium, or can be downloaded to a computer via a communication network.

One embodiment of the present invention will be explained in detail below while referring to the figures. First, an overview of a storage access device related to this embodiment will be explained. Furthermore, in the explanation of this embodiment, descriptions which have the computer program as the subject will be understood to signify that processing is actually being carried out by the CPU, which is executing this computer program.

FIG. 1 is a conceptual view illustrating the principal features of a storage access device related to one embodiment of the present invention.

A host computer (hereinafter "host") 1 corresponds to the storage access device related to this embodiment. The host 1 accesses (a read access or write access) a LU (Logical Unit) 28 provided by a storage system 2. The host 1 (OS 14 of the host 1) recognizes the LU 28 provided by the storage system 2 as a logical VOL (volume) 5. The respective logical VOL 5 correspond to the respective LU 28. For example, in the case of this figure, the host 1 respectively recognizes LU 28A as logical VOL 5A, LU 28B as logical VOL 5B, and LU 28C as logical VOL 5C. Thus, in this embodiment, a distinction is made between the LU 28 provided by the storage system 2 side and the logical VOL 5 recognized by the host 1 side, but if a LU 28 and logical VOL 5 correspond to one another, in essence, they constitute the same storage (the same entity). Therefore, accessing an LU 28 is the same as accessing the logical VOL 5 that corresponds to this LU 28.

In this embodiment, at least one copy-set 8 is created in the storage system 2. As used here, copy-set 8 refers to an aggregate of a plurality of LU 28 configured in the storage system 2 such that the data contents thereof are kept the same. For example, an aggregate of two LU 28, which create one copy-pair, can be treated as one copy-set 8. This is because the data stored in the one LU 28 forming the copy-pair, is copied at a prescribed timing to the other LU 28 forming the copy-pair, thus keeping the data contents of the two LU 28 the same. Furthermore, the copy-source LU 28 is called the "primary LU", and the copy-destination LU 28 is called the "secondary LU". Further, the logical VOL 5 corresponding to the primary LU is called the "primary VOL", and the logical VOL 5 corresponding to the secondary LU is called the "secondary VOL". The timing (cycle) of the copy is pre-configured inside the storage system 2.

Further, when a plurality of copy-pairs are cascaded (that is, when a plurality of copy-pairs are interlinked having the secondary LU of the one copy-pair as the primary LU of the other copy-pair), the aggregate of all the LU 28 forming either of this plurality of copy-pairs can be treated as one copy-set 8. This is because the data contents of the plurality of LU 28 constituting the cascade are kept the same. For example, in this figure, LU 28A, LU 28B and LU 28C are constituted as a cascade, and the aggregate thereof can be treated as one copy-set 8. In this figure, LU 28A and LU 28B create a copy-pair (copy-pair 1), and LU 28B and LU 28C create a copy-pair (copy-pair 2). Then, LU 28B links the two copy-pairs 1 and 2 by constituting the secondary LU of copy-pair 1, and constituting the primary LU of copy-pair 2. In a case like this, the data stored in LU 28A is copied to LU 28B, and the data copied to LU 28B is further copied to LU 28C. That is, the data stored in the LU 28, which does not constitute the secondary LU in either copy-pair (here, LU 28A) is copied to the other LU 28 (here, LU 28B and LU 28C), which form the cascade. Therefore, the data contents of the plurality of LU 28 constituting the cascade are kept the same.

Furthermore, by using the same primary LU for a plurality of copy-pairs, an aggregate of LU 28, which has a one-to-many copy relationship (a relationship in which there a plurality of secondary LU relative to one primary LU) can also form a copy-set 8.

When focusing on one of the plurality of LU 28 forming the copy-set 8 in the explanation of this embodiment, the LU 28 located upstream from the LU 28, which is being targeted, is referred to as the "higher-level LU 28" relative to this targeted LU 28. By contrast, the LU 28 located downstream from the targeted LU 28 is referred to as the "lower-level LU 28" relative to this targeted LU 28. In the example of this figure, when LU 28C is the targeted LU 28, LU 28A and LU 28B both constitute the upper-level LU 28. Conversely, when LU 28A is the targeted LU 28, both the LU 28B and LU 28C constitute the lower-level LU 28. Further, for convenience of explanation, only the highest-level primary LU of the LU 28 forming the copy-set 8 is referred to as the primary LU in this copy-set 8. Therefore, in the case of this figure, LU 28A constitutes the primary LU, and LU 28B and LU 28C constitute secondary LU.

The host 1 comprises a virtual device management program 15. The virtual device management program 15 allocates the logical VOL 5, which respectively correspond to the LU 28 that belong to the same copy-set 8, to one virtual device (hereinafter, "virtual device 4"). That is, the plurality of logical VOL 5 for which the data contents are maintained so as to be the same by the copy function of the storage system 2 (hereinafter, referred to as the "copy function of the copy-set 8") are allocated to the same virtual device 4. Then, the logical VOL 5 allocated to the same virtual device 4 always comprise one primary VOL. This is because a copy-set 8 always comprises one primary LU. In this figure, logical VOL 5A, logical VOL 5B and logical VOL 5C are allocated to the same virtual device 4. Then, logical VOL 5A constitutes the primary VOL of this virtual device 4.

The virtual device management program 15 provides the virtual device 4 to the application 13 instead of the logical VOL 5. More specifically, for example, the virtual device management program 15 shows the application 13 the data contents of the data area 6 (explained hereinbelow) of the primary VOL of the virtual device 4 as the data contents of this virtual device 4. The application 13 issues an I/O request to the provided virtual device 4. The virtual device management program 15 executes different processing depending on whether the received I/O request is a write request or a read request.

More specifically, for example, when a write request for the virtual device 4 is received from the application 13, the virtual device management program 15 writes the write-targeted data to the primary VOL (logical VOL 5A in the example of this figure) of this virtual device 4. That is, if the I/O request received from the application 13 is a write request, the virtual device management program 15 always selects the logical VOL 5A, which is the primary VOL, as the logical VOL to be specified in the write request, and sends the write request specifying the logical VOL 5A to the storage system 2.

Conversely, when a read request for the virtual device 4 is received from the application 13, the virtual device management program 15 reads out the read-targeted data from at least one of the logical VOL 5 in which the data contents are the same as those of the primary VOL of this virtual device 4. That is, if the I/O request received from the application 13 is a read request, the virtual device management program 15 sends the read request, which specifies at least one of the logical VOL 5 having the same data contents as the primary VOL to the storage system 2. In other words, the logical VOL specified in the read request sent to the storage system 2 will differ from that when a write request is received from the application 13, and is not limited to the primary VOL.

Furthermore, since a copy in a copy-set 8 is carried out at a prescribed timing, the data contents of the LU 28 belonging to the same copy-set 8 are not always the same. Therefore, the virtual device management program 15 manages which of the logical VOL 5 allocated to the virtual device 4 constitutes the same data contents with another logical VOL 5 allocated to the virtual device 4. As a result of the virtual device management program 15 providing a function like that described above, the host 1 will not mistakenly send a write request for a secondary VOL to the storage system 2. Further, the host 1 will be able to carry out a read access at high speed. This is because it is possible to simultaneous read out the same data contents from a plurality of logical VOL 5.

Since the above-mentioned function (function for creating a virtual device 4, and providing same to the application 13) is provided, the virtual device management program 15 must know the LU 28 corresponding to the logical VOL 5 that forms the copy-set 8 in the storage system 2 (which copy-set 8 this LU 28 belongs to). In this embodiment, for example, one method used to know this is a method that provides a control area 6 to the storage area inside the logical VOL 5 (in other words, a method, which divides the storage area into a control area 6 and a data area 7). The data area 7 is a normal storage area for storing data handled by the application 13. Conversely, the control area 6 is a storage area, which the virtual device management program 15 uses to manage the virtual device 4. The information (hereinafter, "control information") written to the control area will be explained in detail below, but, for example, the control information comprises an ID (hereinafter, "copy ID") for identifying the copy-set 8. The virtual device management program 15 can use the copy ID to learn the logical VOL 5 respectively corresponding to the LU 28, which belong to the same copy-set 8, and can allocate these logical VOL 5 to the same virtual device 4. An overview of the process for allocating the logical VOL 5 to the virtual device 4 when using the copy ID will be explained below by referring to FIGS. 2 through 7.

FIGS. 2 through 7 are diagrams showing an overview of the process for allocating the logical VOL 5 to the virtual device 4.

Figure 2:
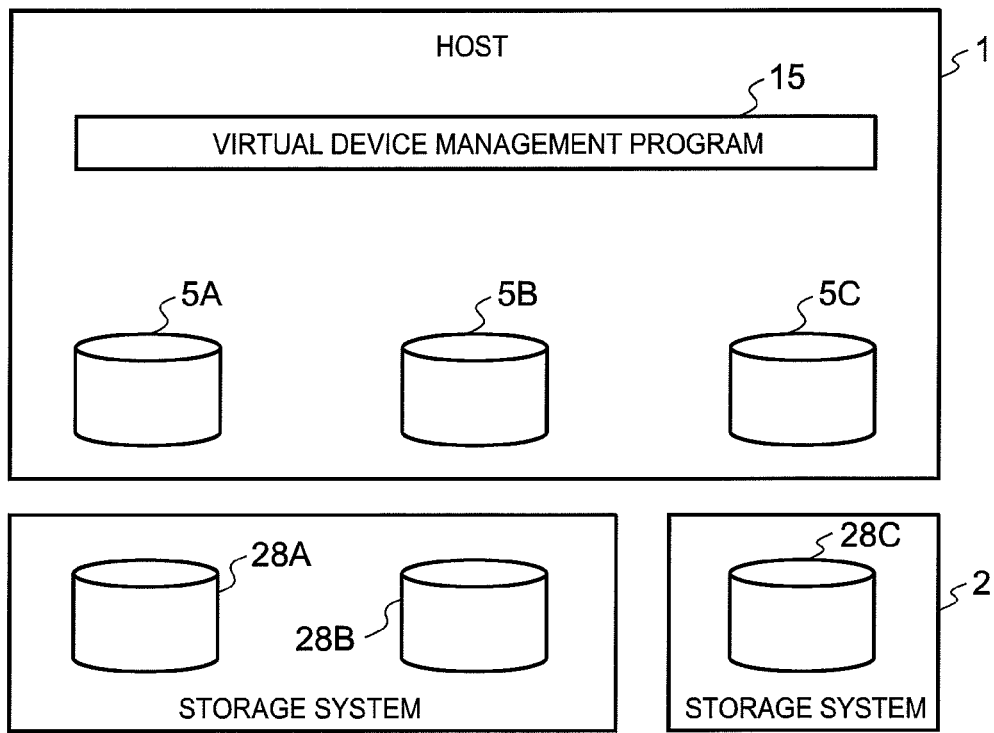
FIG. 2 is a diagram showing the respective logical VOL and respective LU prior to allocating a logical VOL to a virtual device.
Figure 3:
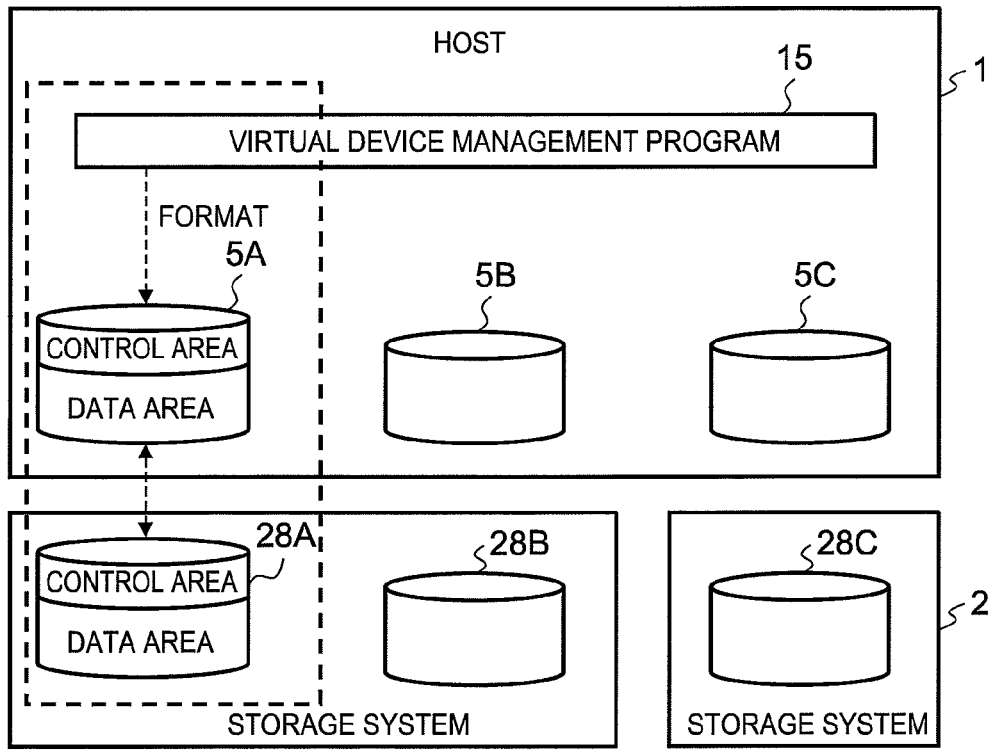
FIG. 3 is a diagram showing the respective logical VOL and respective LU when control information is written to logical VOL 5A, which is the target logical VOL.

As shown in FIG. 2, prior to first performing this process, control areas 6 are provided to all the logical VOL 5 (LU 28). In this state, as shown in FIG. 3, the virtual device management program 15, for example, writes control information (comprising at least a copy ID) to one logical VOL 5 (called "target logical VOL 5" in this explanation, and in this example is logical VOL 5A). Since the storage area into which this control information is written becomes the control area 6, a control area 6 is provided in logical VOL 5A in accordance with this write. Furthermore, a control area 6 is also provided in LU 28A. This is because logical VOL 5A and LU 28A correspond to one another, and the data contents thereof are the same. Hereinafter, providing a control area 6 by writing control information into a logical VOL 5, which is not provided with a control area 6 (that is, dividing the storage area of the logical VOL 5 into a control area 6 and a data area 7), will be referred to as "formatting a logical VOL 5".

Figure 4:
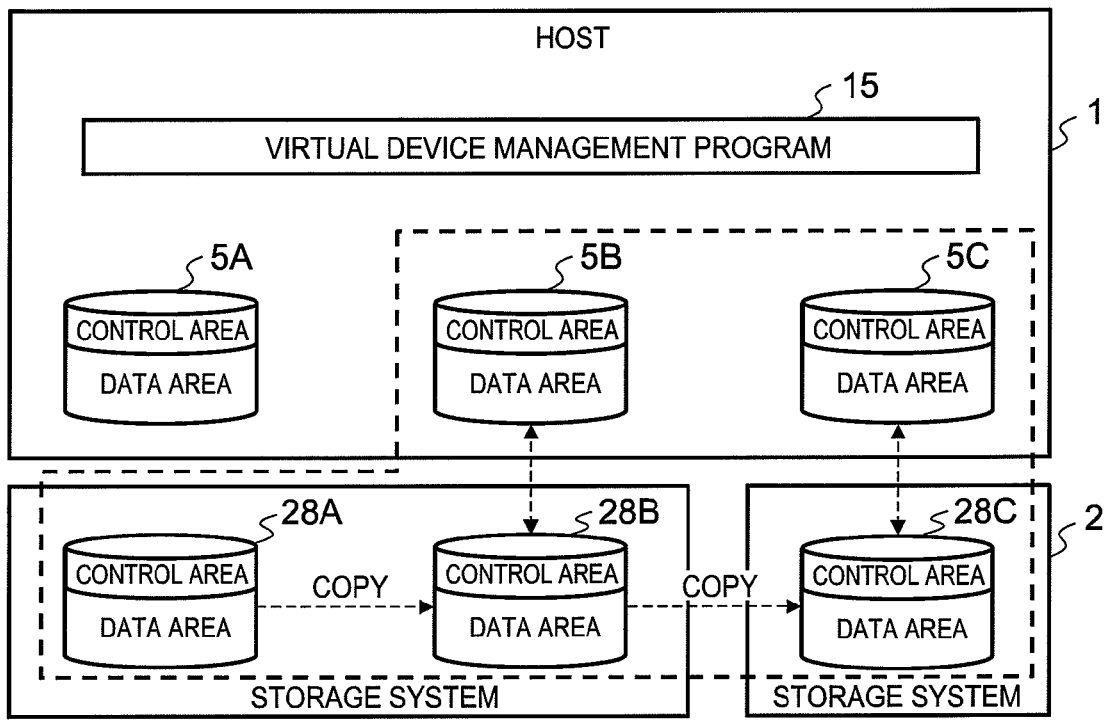
FIG. 4 is a diagram showing the respective logical VOL and respective LU when the data of LU 28A is copied to LU 28B and 28C, which belong to the same copy-set as LU 28A.

Thereafter, as shown in FIG. 4, the data of LU 28A is copied to the LU 28 that belong to the same copy-set 8 as LU 28A (that is, LU 28B and LU 28C) using the copy-set 8 copy function. Furthermore, the data contents of logical VOL 5B and logical VOL 5C are also the same as those of LU 28A. This is because LU 28B corresponds to logical VOL 5B, and LU 28C corresponds to logical VOL 5C. That is, the data of logical VOL 5A is copied to logical VOL 5B and logical VOL 5C in accordance with the copy-set 8 copy function. Further, logical VOL 5B and logical VOL 5C are formatted by the copy-set 8 copy function without being formatted by the virtual device management program 15.

Figure 5:
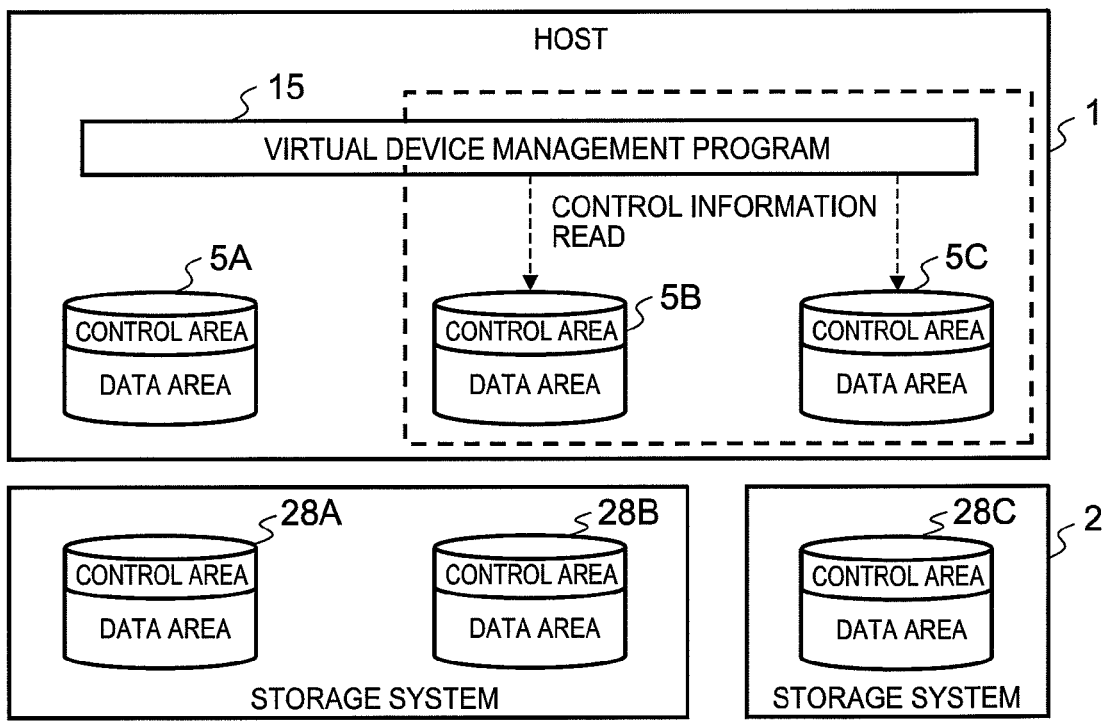
FIG. 5 is a diagram showing that control information was read from logical VOL 5B and 5C, which are not the targeted logical VOL.

Next, as shown in FIG. 5, the virtual device management program 15 reads control information from the control area 6 of the formatted logical VOL 5 (logical VOL 5B and logical VOL 5C in this example) of the logical VOL 5 other than the target logical VOL 5 (in this example, logical VOL 5A).

Figure 6:
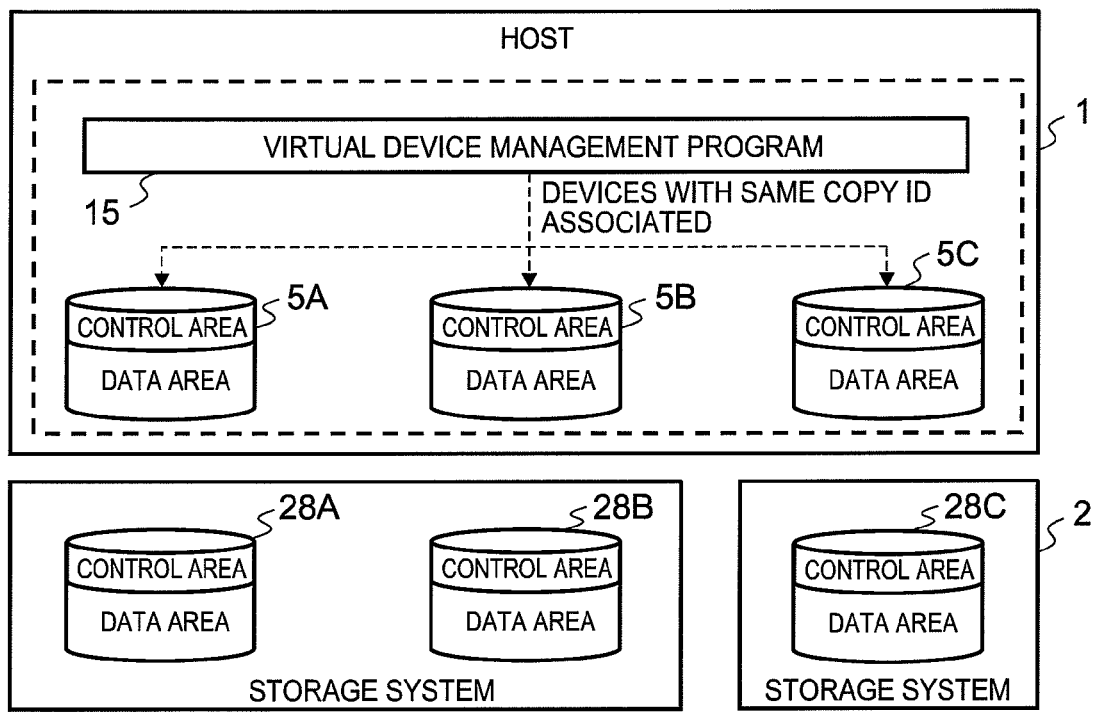
FIG. 6 is a diagram showing that logical VOL 5B and 5C, to which the copy ID comprised in the read control information coincides, are associated to the targeted VOL 5A, which is treated as the write destination of the control information comprising this copy ID.

Thereafter, the virtual device management program 15 checks whether or not a copy ID comprised in the read-in control information matches the copy ID written when the target logical VOL 5 was formatted. If there is a match, as shown in FIG. 6, the logical VOL 5 into which this matching copy ID is written is associated to the target logical VOL 5. In this example, as described hereinabove, LU 28A, LU 28B and LU 28C belong to the same copy-set 8, and the data contents thereof are the same (that is, the control information is also the same). Therefore, the copy ID respectively written into logical VOL 5B and logical VOL 5C match with the copy ID written when logical VOL 5A was formatted, and logical VOL 5A, logical VOL 5B and logical VOL 5C become associated.

Figure 7:
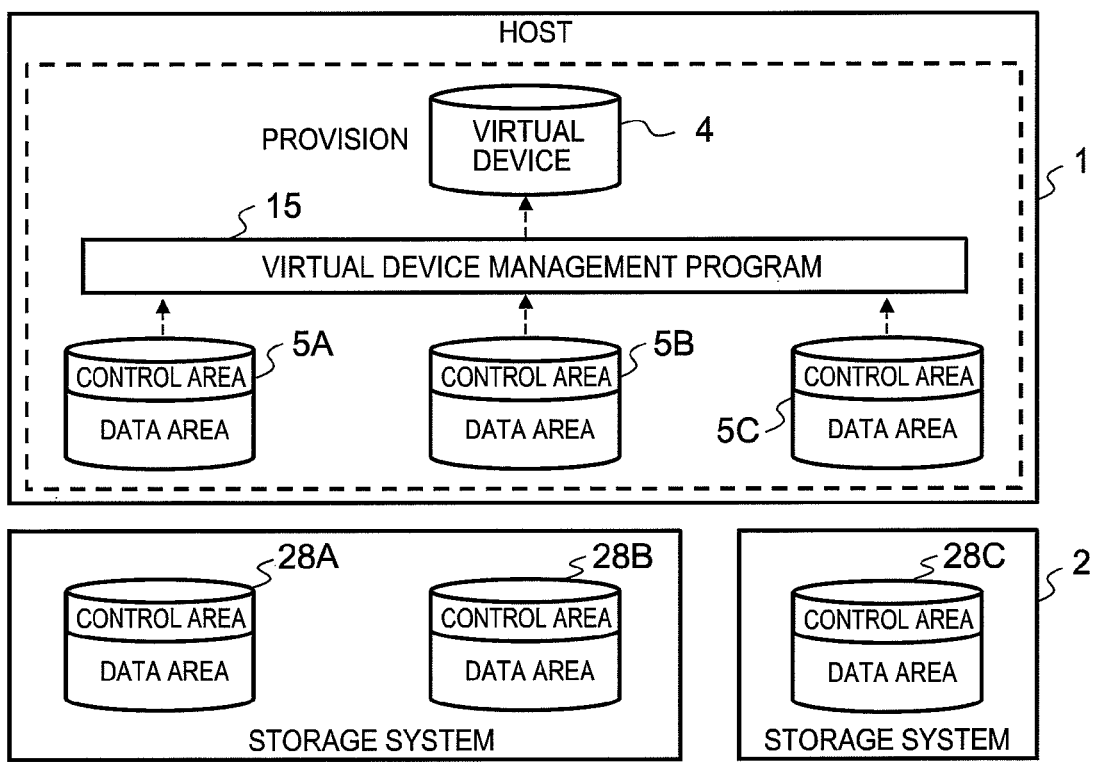
FIG. 7 is a diagram showing that the associated logical VOL 5A, 5B and 5C have been allocated to the same virtual device.

Thereafter, as shown in FIG. 7, the virtual device management program 15 allocates the associated logical VOL 5 (that is, 5A, 5B and 5C) to the same virtual device 4. Then, the virtual device management program 15 provides the virtual device 4 to which the associated logical VOL 5 have been allocated to the host 1.

In accordance with the above, the storage system 2 function (copy-set 8 copy function) is used to allocate logical VOL 5, the data contents of which are kept the same, to the same virtual device 4. Furthermore, the above-described process is merely one example, and the allocation of logical VOL 5 to the virtual device 4 can be carried out using a variety of procedures that differ from those described hereinabove.

Figure 8:
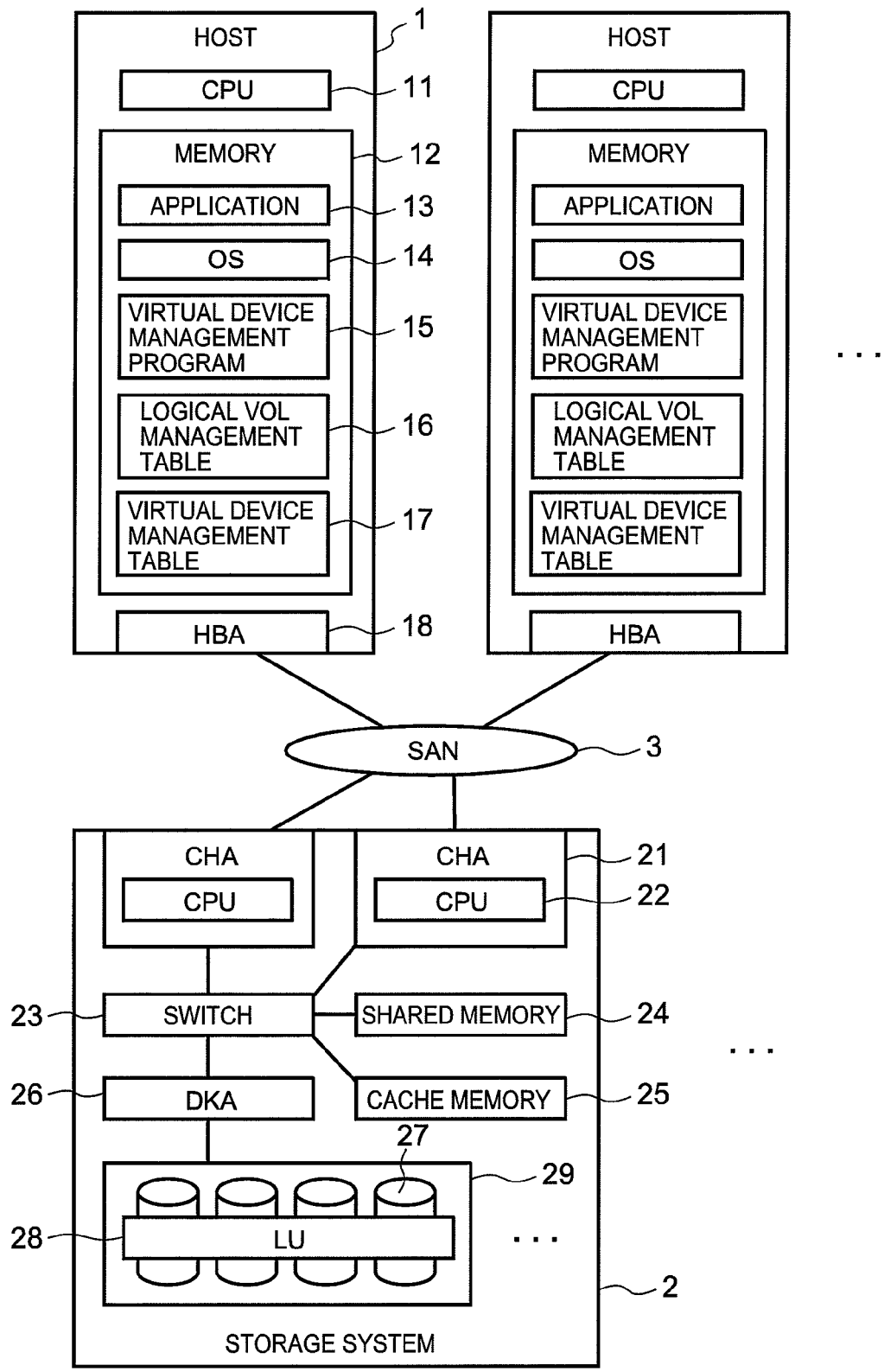
FIG. 8 is a diagram showing an example of the constitution of a computer system related to this embodiment.

FIG. 8 is a diagram showing an example of the constitution of a computer system related to this embodiment.

The hosts 1 and storage system 2 are connected via a communication network 3 (for example, a SAN (Storage Area Network)). At least one of the hosts 1 or the storage system 2 can also be connected to a plurality of communication networks 3.

The host 1 is a computer for accessing a storage device 27 comprising the storage system 2 (a LU 28 provided by the storage system 2).

The host 1, for example, comprises an HBA (Host Bus Adapter) 18, which is an interface for connecting a CPU 11, a memory 12 and the storage system 2. The memory 12, for example, stores the application 13, an OS (Operating System) 14, the virtual device management program 15, a logical VOL management table 16, and a virtual device management table 17. Details concerning the processing carried out by the virtual device management program 15, and the various tables (logical VOL management table 16 and virtual device management table 17) will be explained below.

The storage system 2, for example, can be a RAID (Redundant Array of Independent (or Inexpensive) Disks) system comprising a large number of storage devices (for example, hard disk drives (HDD)) 27 arranged in an array. The storage devices 27 are not limited to HDD, and can also be constituted from other types of media drives (for example, flash memory drives), and a plurality of types of media drives can be used together. In this embodiment, it is supposed that the storage devices 27 are constituted from HDD (storage device 27 will be explained as HDD 27). The storage system 2 controller, for example, comprises a CHA (Channel Adapter) 21, a DKA (Disk Adapter) 26, a switch 23, a shared memory 24, and a cache memory 25. Access to the HDD 27 is controlled by the storage system 2 controller. Furthermore, for example, the functions of the storage system 2 controller can be mounted in an FC (Fibre Channel) switch comprising the communication network 3, and the storage system 2 can be realized by combining the FC switch with the plurality of HDD 27.

The CHA 21 has either one or a plurality of I/F (for example, communication ports or communication control circuits comprising communication ports), which are communicably connected to an external device (for example, the host 1 or another storage system 2), and carry out data communications with the external device. The CHA 21 is constituted as a microcomputer system (for example, a circuit board) comprising a CPU 22, memory and so forth. The CHA 21, for example, upon receiving a write request from the host 1, respectively writes write-targeted data to the cache memory 25, and the command received from the host 1 to the shared memory 24. Further, the CHA 21, upon receiving a read request from the host 1, writes the command received from the host 1 to the shared memory 24, and also sends the read-targeted data, which the DKA 26 reads out from the HDD 27 and writes to the cache memory 25, to the host 1.

The DKA 26 has either one or a plurality of drive I/F (for example, communication ports or communication control circuits comprising communication ports), which are communicably connected to the respective HDD 27, and carries out data communications with the HDD 27. The DKA 26 is constituted as a microcomputer system (for example, a circuit board) comprising a CPU, memory and so forth. The DKA 26, for example, either write write-targeted data, which has been written to the cache memory 25 from the CHA 21, to the HDD 27, or writes read-targeted data read out from the HDD 27 to the cache memory 25.

The switch 23, for example, is a crossbar switch, and is a device for interconnecting the CHA 21, DKA 26, shared memory 24 and cache memory 25. Another type of connector, such as a bus, can be used instead of the switch 23.

The shared memory 24, for example, can be constituted from either a nonvolatile or a volatile semiconductor memory. The shared memory 24, for example, stores various commands received from the host 1, and control information, which is used to control the storage system 2. The commands, control information and the like can also be redundantly stored in a plurality of shared memories 24.

The cache memory 25, for example, can be constituted from either a volatile or nonvolatile semiconductor memory. The cache memory 25 stores data received from the host 1, and data read out from the HDD 27. Furthermore, the shared memory 24 and cache memory 25 can be constituted as respectively separate memories as in this embodiment, or can be constituted from a single memory. If constituted from a single memory, for example, one part of the memory is used as a cache memory area, and another part of the same memory is used as a shared memory area.

Further, in the storage system 2, for example, one or more RAID groups 29 are constituted from a plurality of HDD 27. A RAID group 29, for example, provides a redundant storage system based on RAID 1 or RAID 5. The LU 28 are created by the respective storage areas of the plurality of HDD 27 comprised in the RAID group 29 being allocated one part at a time. The LU 28 are provided to the host 1 from the storage system 2.

Next, the various types of tables comprised in the host 1 (logical VOL management table 16 and virtual device management table 17) will be explained in detail by referring to FIGS. 9 and 10. Furthermore, the reference numerals attached to the tables of the respective figures designate columns and fields, and do not designate the values themselves stored in the columns and fields. Therefore, when designating a column or field in the following explanation, the explanation will be given using a reference numeral, and when not designating a column or field, the explanation will be given without using a reference numeral. The same will hold true for the control area 6, which will be explained by referring to FIG. 11.

FIG. 9 is a diagram showing an example of a logical VOL management table 16.

The logical VOL management table 16 is for managing various information related to the logical VOL 5 recognized by the host 1. Further, the logical VOL management table 16 also manages information related to the virtual device 4 (for example, information for specifying the logical VOL 5 that have been allocated, which logical VOL 5 is the primary VOL, and which logical VOL 5 is to be targeted for read access and which for write access).

The logical VOL management table 16, for example, records a logical VOL ID, copy ID, access storage information, virtual device ID, Role information, update time, and access information for each logical VOL 5. More specifically, the logical VOL management table 16 comprises a column for a logical VOL ID 161, a copy ID 162, access storage information 163, a virtual device ID 164, Role information 165, an update time 166, and access information 167. Logical VOL ID 161 is the column for storing the logical VOL ID assigned to these logical VOL 5. The logical VOL ID is an identifier for uniquely specifying a logical VOL 5 in the host 1. Copy ID 162 is the column for storing the copy ID assigned to the copy-set 8 to which the LU 28 corresponding to these logical VOL 5 belong. The copy ID is an identifier for uniquely specifying a copy-set 8. Access storage information 163 is the column for storing various information related to the LU 28 corresponding to these logical VOL 5 (hereinafter, "access storage information"). Access storage information, for example, comprises the LUN (Logical Unit Number) of these LU 28, and the vendor name, model name, and serial number of the storage system 2 created by these LU 28. Virtual device ID 164 is the column for storing the virtual device ID assigned to the virtual device 4 to which these logical VOL 5 have been allocated. The virtual device ID is an identifier for uniquely specifying a virtual device 4. Role information 165 is the column for storing information (hereinafter, "Role information") showing the roles of these logical VOL 5 (for example, primary VOL or secondary VOL) in the virtual device 4 to which these logical VOL 5 have been allocated. For example, if a logical VOL 5 is a primary VOL, a "P" is configured in Role information 165, and if a logical VOL 5 is a secondary VOL, an "S" is configured in Role information 165. Update time 166 is the column for storing the time at which the data of these logical VOL 5 were last updated (hereinafter, "update time"). Access information 167 is the column for storing information showing whether or not it is possible to access these logical VOL 5 (hereinafter, "access information"). Access information 167 W (notated as "access information (W) 167" hereinafter) is the column for storing information showing whether or not a write access is possible. Access information 167 R (notated as "access information (R) 167" hereinafter) is the column for storing information showing whether or not a read access is possible. For example, when access is possible, "Y" is configured in access information 167, and when access is not possible, "N" is configured in access information 167. Furthermore, normally a "Y" is configured in access information (W) 167 when the logical VOL 5 thereof is a primary VOL, and "N" is configured when the logical VOL 5 thereof is a secondary VOL. Further, "Y" is configured in access information (R) 167 when the logical VOL 5 thereof is a primary VOL, or when the update time of the logical VOL 5 is the same as the update time of the primary VOL in the virtual device 4 to which this logical VOL 5 is allocated, and "N" is configured in all other situations.

Figures 10, 11:
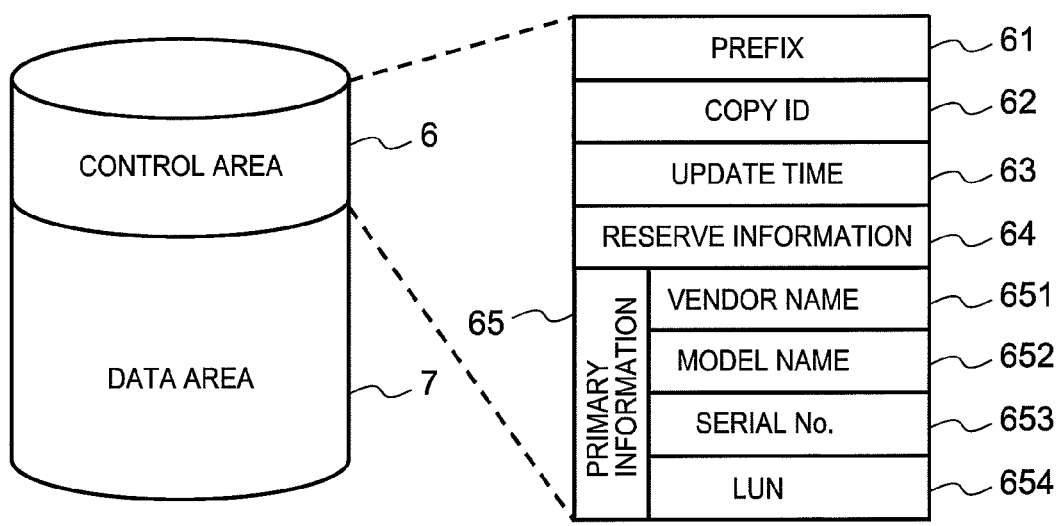
FIG. 10 is a diagram showing an example of a virtual device management table.
FIG. 11 is a diagram showing an example of the structure of a control area.

FIG. 10 is a diagram showing an example of a virtual device management table 17.

The virtual device management table 17 is for managing various information related to respective virtual devices 4. The virtual device management table 17 manages information related to the primary VOL of a virtual device 4 as information related to the virtual device 4. Therefore, the virtual device management table 17 stores information (for example, the virtual device ID, access storage information, and update time) related to a primary VOL extracted from the logical VOL management table 16 (the logical VOL 5 for which "P" is configured in Role information 165). The access storage information in the logical VOL management table 16 corresponds to the primary information in the virtual device management table 17. Furthermore, this table 17 does not necessarily have to be provided. This is because, as was described hereinabove, information related to the virtual device 4 can also be managed by the logical VOL management table 16.

FIG. 11 is a diagram showing an example of the structure of the control area 6.

The control area 6, for example, comprises a field 61 for storing a prefix; a field 62 for storing a copy ID; a field 63 for storing an update time; a field 64 for storing reserve information; and fields for storing primary information (vendor name, model name, serial number, and LUN). That is, control information, for example, comprises a prefix, copy ID, update time, reserve information, and primary information (vendor name, model name, serial number, and LUN). The prefix is information showing that a logical VOL 5 has already been formatted. The copy ID, as mentioned hereinabove, is an identifier for uniquely specifying a copy-set 8. The update time, as mentioned hereinabove, is the time at which the data of a logical VOL 5 was last updated. The reserve information is reserved information (arbitrary information that can be written as needed). The control information, with the exception of the primary information, is information related to the logical VOL 5 into which this control information has been written. Therefore, for example, the copy ID, which has been written to a logical VOL 5 is the copy ID of this logical VOL 5. Meanwhile, the primary information constitutes information related to the primary VOL (the logical VOL into which this primary information is written when this logical VOL 5 is the primary VOL) of the virtual device 4 to which the logical VOL 5 in which this primary information has been written is allocated.

The preceding is an explanation of the constitution of the storage access device and storage system 2 related to this embodiment. The flows of the various processes carried out by this embodiment will be explained below.

Figure 12:
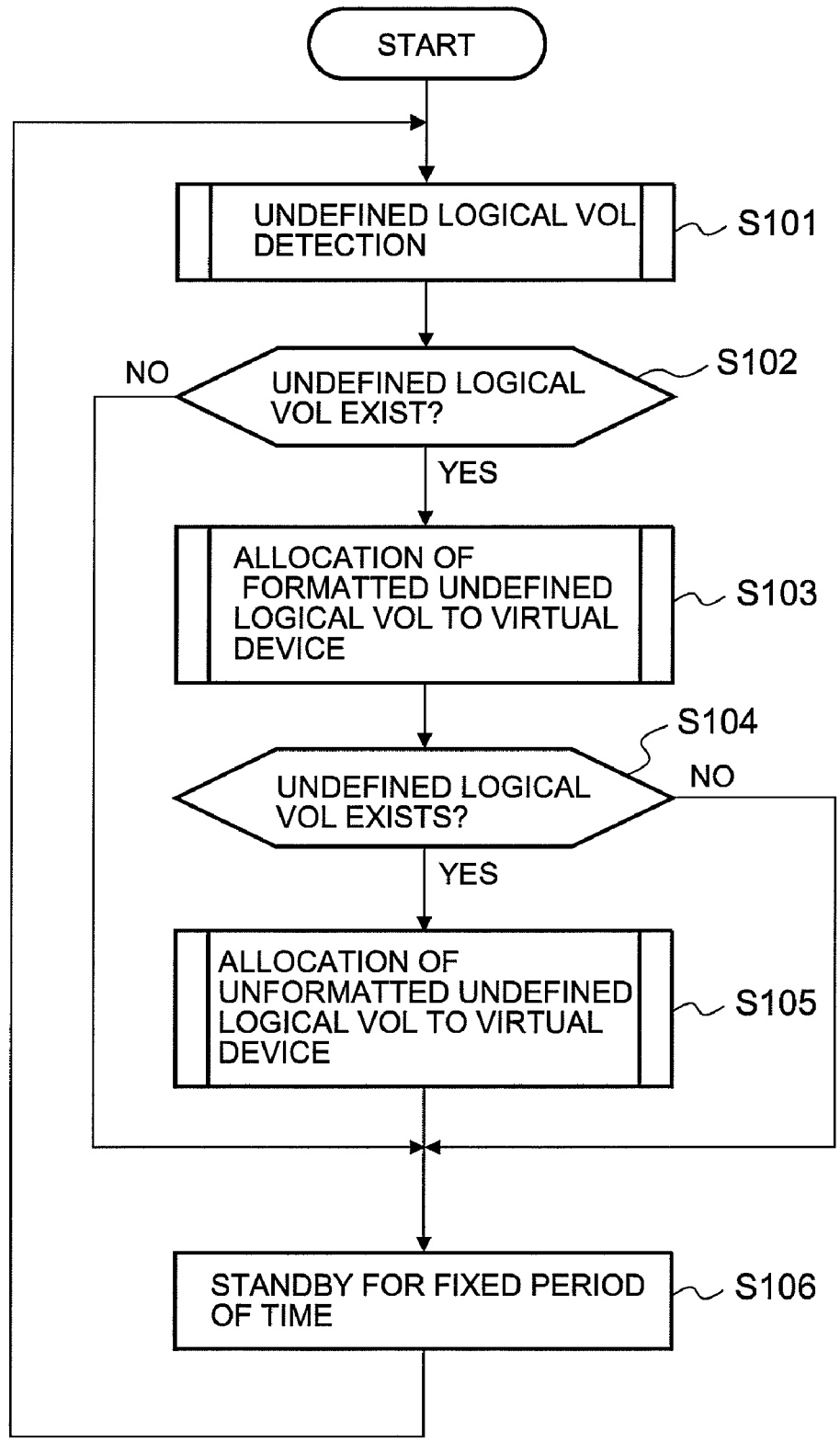
FIG. 12 is a flowchart of the process for allocating a logical VOL to the virtual device.

FIG. 12 is a flowchart of the process for allocating a logical VOL 5 to a virtual device 4.

This process is carried out by the virtual device management program 15. The virtual device management program 15 either regularly or irregularly detects a logical VOL 5, which has yet to be allocated to a virtual device 4. When a logical VOL 5 that has yet to be allocated to a virtual device 4 is detected, the virtual device management program 15 allocates the detected logical VOL 5 to either an existing virtual device 4 or a newly created virtual device 4. The specific process flow is as follows.

First, the virtual device management program 15 detects a logical VOL 5 for which allocation to a virtual device 4 has yet to be carried out (S101). Furthermore, a logical VOL 5 for which it has been decided that allocation to a virtual device 4 is not possible (a logical VOL 5 for which "undefinable" is configured in virtual device ID 164) is not included in what is referred to here as a logical VOL 5 that has yet to be allocated to a virtual device 4. Hereinafter, a logical VOL 5 for which allocation to a virtual device 4 has yet to be carried out, that is, a logical VOL 5 for which "undefined" has been configured in the virtual device ID 164 column of the logical VOL management table 16, will be referred to as "undefined logical VOL 5". The processing of this S101 will be explained in detail hereinbelow by referring to FIG. 13.

Next, the virtual device management program 15 determines whether or not an undefined logical VOL 5 was detected as a result of the processing of S101 (S102). More specifically, the virtual device management program 15 refers to the logical VOL management table 16, and determines whether or not there is a logical VOL 5 for which "undefined" is configured in virtual device ID 164.

When an undefined logical VOL 5 does not exist (S102: NO), this process moves to S106. That is, in this case, the virtual device management program 15 stands by until an undefined logical VOL 5 is detected. This is because a logical VOL 5, which constitutes a target to be allocated to a virtual device 4, does not exist.

Conversely, when undefined logical VOL 5 do exist (S102: YES), the virtual device management program 15 carries out allocation to a virtual device 4 for the undefined logical VOL 5, which have been formatted (S103). The processing of this S103 will be explained in detail hereinbelow by referring to FIG. 14.

Thereafter, the virtual device management program 15 once again determines whether or not undefined logical VOL 5 exist (S104). This determination is carried out using the same method as the determination of the above-mentioned S102. Furthermore, when undefined logical VOL 5 exist at the point in time of this S104, these undefined logical VOL 5 all constitute unformatted logical VOL 5. This is because it was decided in S103 that the formatted undefined logical VOL 5 either would be allocated to the virtual device 4 or could not be allocated to the virtual device 4 (that is, a value other than "undefined" was configured in virtual device ID 164 on the logical VOL management table 16).

When there are no undefined logical VOL 5 (S104: NO), this process moves to S106. That is, the virtual device management program 15 transitions to stand-by until an undefined logical VOL 5 is detected. This is because there is no logical VOL 5 constituting a target to be allocated to the virtual device 4 due to S103.

Conversely, when undefined logical VOL 5 exist (S104: YES), the virtual device management program 15 carries out allocation to the virtual device 4 for the undefined logical VOL 5 that have not been formatted (S105). This processing will be explained in detail hereinbelow by referring to FIG. 15.

Thereafter, the virtual device management program 15 transitions to stand-by for a fixed period of time (S108). Thereafter, this process moves to S101.

Figure 13:
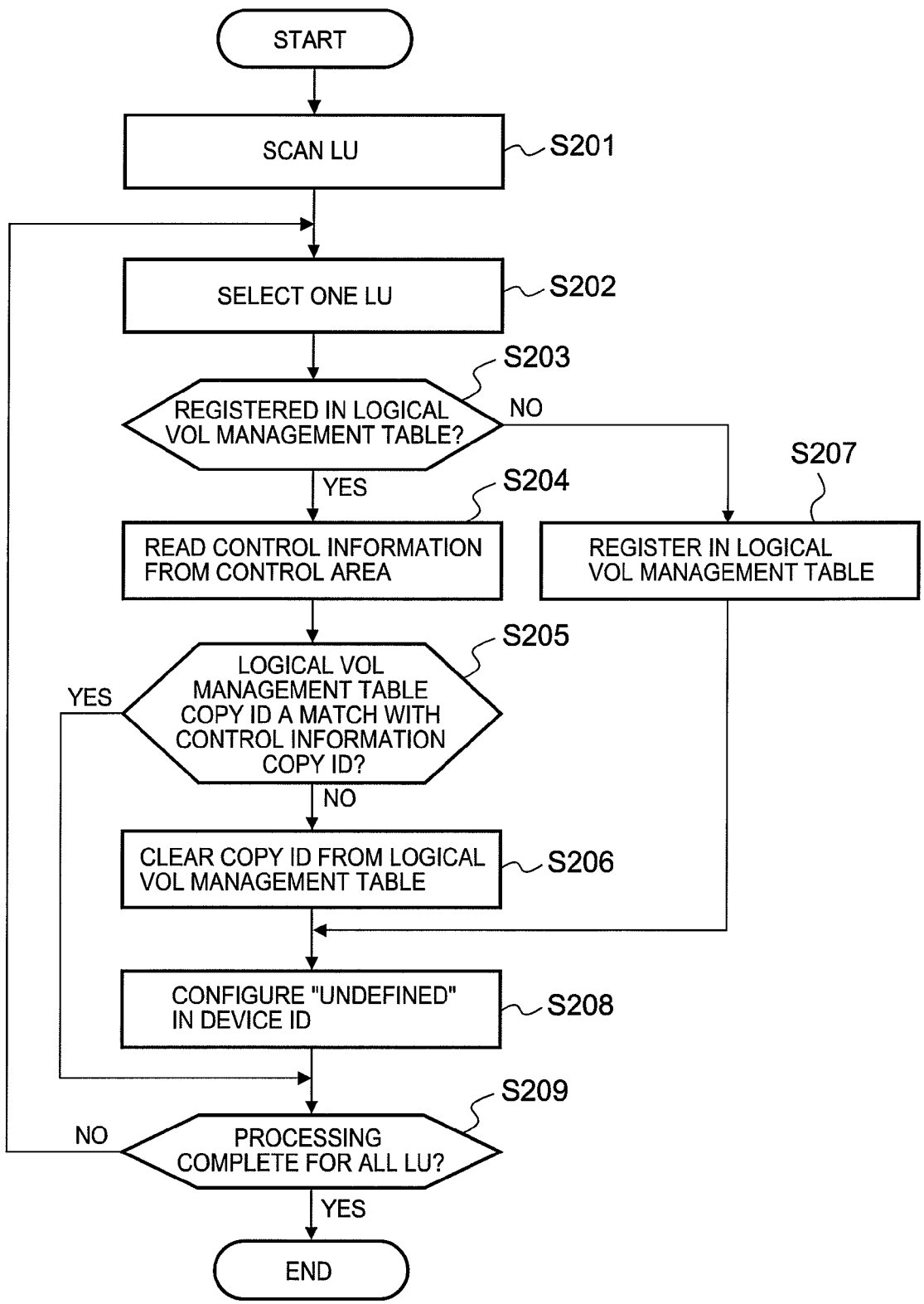
FIG. 13 is a flowchart of the process for detecting an undefined logical VOL.

FIG. 13 is a flowchart of the process for detecting an undefined logical VOL 5.

This process corresponds to the processing of S101 in FIG. 12. Carrying out this process detects an undefined logical VOL 5.

First, the virtual device management program 15 sends a command (for example, a discovery command) to the storage system 2 to acquire a list of LU 28, which the storage system 2 will provide to the host 1 (S201). In response to this command, for example, the virtual device management program 15 receives from the storage system 2 a list of LUN of the LU 28.

Next, the virtual device management program 15 selects one of the LU 28 comprised in the list of LU 28 obtained in S201 (S202).

The virtual device management program 15 determines whether or not information related to logical VOL 5 corresponding to the LU 28 selected in S202 is already recorded in the logical VOL management table 16 (S203). More specifically, the virtual device management program 15 refers to the logical VOL management table 16, and determines whether or not there is a logical VOL 5 for which the LUN of the LU 28 selected in S202 is configured in LUN 1634 of access storage information 163. Hereinafter, in the explanation of this process, the logical VOL 5 corresponding to the LU 28 selected in S202 will be referred to as the "target logical VOL 5".

When information related to a target logical VOL 5 is not recorded in the logical VOL management table 16 (S203: NO), the virtual device management program 15 records information related to the target logical VOL 5 in the logical VOL management table 16 (S207). More specifically, the virtual device management program 15 first attaches to the target logical VOL 5 an arbitrary ID, which does not duplicate the logical VOL ID 161 of the other logical VOL 5. Then, the virtual device management program 15 configures this attached ID in the logical VOL ID 161 of the target logical VOL 5. Next, the virtual device management program 15 sends a command (for example, an inquiry command) to the storage system 2 to acquire detailed information related to the LU 28 corresponding to the target logical VOL 5 (for example, the vendor name, model name, and serial number of the storage system 2 comprising this LU 28). Then, the virtual device management program 15 configures the information (vendor name, model name, serial number) obtained by sending this command in the vendor name 1631, model name 1632, and serial number 1633 of the access storage information 163 of the target logical VOL 5. That is, the registration of the information related to the target logical VOL 5 in S207 configures the logical VOL ID and access storage information in the logical VOL management table 16. Furthermore, in S207, for example, default values of one sort or another are configured in the columns for storing other information (copy ID and so forth). In particular, copy ID 162 is initialized (in this embodiment, a "-" is configured). This is because this and subsequent processes will not be carried out normally if an erroneous value is configured in copy ID 162.

Thereafter, this processing proceeds to S208. That is, "undefined" is configured in virtual device ID 164 of the logical VOL management table 16 for the logical VOL 5 newly registered in the logical VOL management table 16 (S208). This is because the newly registered logical VOL 5 has yet to be allocated to the virtual device 4, and is treated as a target for allocation to the virtual device 4.

Conversely, when the information related to the target logical VOL 5 is registered in the logical VOL management table 16 (S203: YES), the virtual device management program 15 reads the control information (at least the copy ID) from the control area 6 of the target logical VOL 5 (S204).

Next, the virtual device management program 15 determines whether or not the copy ID of the target logical VOL 5 registered in the logical VOL management table 16 matches the copy ID comprised in the control information read in S204 (S205).

When the two copy ID match up in the determination of S205 (S205: YES), this process moves to S209. That is, in this case, the virtual device ID 164 of the target logical VOL 5 is left as-is in the logical VOL management table 16 (remains unchanged as "undefined"). This is because there is no need to change the virtual device 4 to which the target logical VOL 5 is allocated since the copy ID written to the control area has not been overwritten with a different copy ID, and the LU 28 corresponding to the target logical VOL 5 has not changed to a different copy-set 8.

Conversely, when the two copy ID in the determination of S205 do not match (S205: NO), the virtual device management program 15 clears the copy ID 162 of the target logical VOL 5 in the logical VOL management table 16 (in this embodiment, configures a "-" in copy ID 162) (S206).

Then, the virtual device management program 15 changes the virtual device ID 164 of the target logical VOL 5 in the logical VOL management table 16 to "undefined" (S208). This is because the copy-set 8 to which the LU 28 corresponding to the target logical VOL 5 belongs has changed, and the virtual device 4 to which the target logical VOL 5 is allocated must be changed. Furthermore, in the processing subsequent thereto, allocation to the virtual device 4 is carried out for the logical VOL 5 for which this "undefined" was configured (the undefined logical VOL 5).

Thereafter, the virtual device management program 15 determines whether or not the processing of S202 through S207 has been implemented for all the LU 28 comprised in the list of LU 28 obtained in S201 (S209).

When processing has not been completed for all the LU 28 comprised in the list of LU 28 obtained in S201 (S209: NO), this process moves to S202.

Conversely, when processing has been completed for all the LU 28 comprised in the list of LU 28 obtained in S201 (S209: YES), this process ends.

Figure 14:
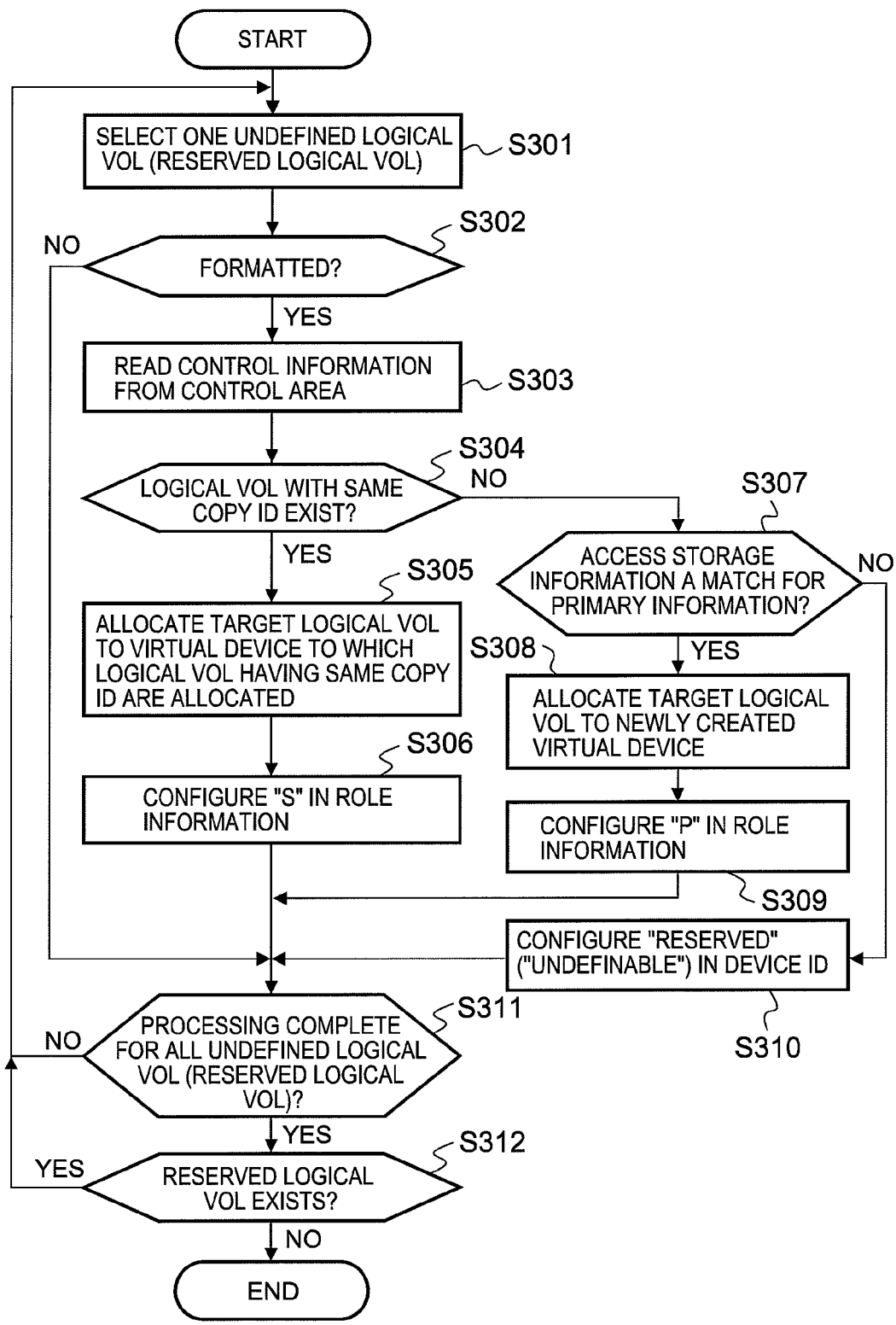
FIG. 14 is a flowchart of the process for allocating a formatted undefined logical VOL to the virtual device.

FIG. 14 is a flowchart of the process for allocating a formatted undefined logical VOL 5 to the virtual device 4.

This process is carried out in the processing of S103 of FIG. 12. Carrying out this process allocates a formatted undefined logical VOL 5 to a virtual device 4 (or, determines that allocation to the virtual device 4 is not possible).

First, the virtual device management program 15 references the logical VOL management table 16, and selects one of the logical VOL 5 for which "undefined" is configured in virtual device ID 164 (undefined logical VOL 5) (S301). Hereinafter, in the explanation of this process, this logical VOL 5 selected in S301 will be referred to as the "target logical VOL 5".

The virtual device management program 15 determines whether or not the target logical VOL 5 is already formatted (S302). More specifically, for example, the virtual device management program 15 access the target logical VOL 5, and checks whether or not there is a control area 6 in the target logical VOL 5. For example, the virtual device management program 15 can learn whether or not a control area 6 exists in the target logical VOL 5 by checking if it is possible to read control information from the target logical VOL 5. If control information can be read from the target logical VOL 5, the virtual device management program 15 can make the determination that the target logical VOL 5 is already formatted.

When the target logical VOL 5 is not yet formatted (S302: NO), this process moves to S311. That is, the processing of S303 is not carried out for an unformatted undefined logical VOL 5.

Conversely, when the target logical VOL 5 is already formatted (S302: YES), the virtual device management program 15 reads the control information from the control area 6 of the target logical VOL 5 (S303).

Next, the virtual device management program 15 determines whether or not a logical VOL 5, which has the same copy ID as the copy ID comprised in the control information read in S303, is registered in the logical VOL management table 16 (S304). Here, a logical VOL 5 for which some sort of copy ID (in this embodiment, a value other than "-") is configured in the logical VOL management table 16 is a logical VOL 5, which has already been allocated to the virtual device 4. Then, the logical VOL 5 having the same copy ID are allocated to the same virtual device 4. Therefore, when logical VOL 5 having the same copy ID are registered in the logical VOL management table 16, the target logical VOL 5 is allocated to an existing virtual device 4 (the virtual device 4 to which the logical VOL 5 having this same copy ID is allocated).

In S304, when it is determined that logical VOL 5 having the same copy ID are registered (S304: YES), the virtual device management program 15 allocates the target logical VOL 5 to the virtual device 4 to which the logical VOL 5 having the same copy ID is allocated (S305). More specifically, the virtual device management program 15 references the logical VOL management table 16 and acquires the virtual device ID of the logical VOL 5 having this same copy ID. Then, the virtual device management program 15 changes virtual device ID 164 of the target logical VOL 5 in the logical VOL management table 16 from "undefined" to the above-mentioned acquired virtual device ID (the virtual device ID of the logical VOL 5 having the same copy ID). Further, the virtual device management program 15 configures the copy ID comprised in the control information read in S303 in the copy ID 162 of the target logical VOL 5 in the logical VOL management table 16.

Then, the virtual device management program 15 configures "S" in the Role information 165 of the target logical VOL 5 in the logical VOL management table 16 (S306). This is because the target logical VOL 5 cannot become a primary VOL since a primary VOL has already been allocated to the existing virtual device 4. Thereafter, this process moves to S311.

Conversely, when it is determined in S304 that logical VOL 5 having the same copy ID are not registered (S304: NO), the virtual device management program 15 determines if the target logical VOL 5 is a primary VOL or a secondary VOL. This is because the virtual device management program 15 determines whether or not the target logical VOL 5 can be allocated to a newly created virtual device 4. If the target logical VOL 5 is a primary VOL, the virtual device management program 15 determines that the target logical VOL 5 can be allocated to the newly created virtual device 4. More specifically, the virtual device management program 15 determines whether or not the access storage information of the target logical VOL 5 in the logical VOL management table 16 matches the primary information comprised in the control information read in S303 (S307). A determination is made here as to whether or not all the information (for example, vendor name, model name, serial number, and LUN) comprised in both types of information match. If the two types of information match, the target logical VOL 5 is determined to be a primary VOL, and if the two types of information do not match, the target logical VOL 5 is determined to be a secondary VOL.

When the access storage information in the logical VOL management table 16 does not match the primary information in the control area 6 (that is, when the target logical VOL 5 is a secondary VOL) (S307: NO), the virtual device management program 15 configures "reserved" in the virtual device ID 164 of the target logical VOL 5 in the logical VOL management table 16 (S310). Subsequent to the processing of S301 through S310 being completed for all undefined logical VOL 5, S301 through S310 are carried out once again for the logical VOL 5 for which this "reserved" has been configured (hereinafter, "reserved logical VOL 5"). This is because the reserved logical VOL 5 can be allocated to a newly created virtual device 4 in the second processing of S308. Thereafter, this processing proceeds to S311.

Conversely, when the access storage information in the logical VOL management table 16 matches the primary information in the control area 6 (that is, when the target logical VOL 5 is a primary VOL) (S307: YES), the virtual device management program 15 creates a new virtual device 4. Then, the virtual device management program 15 allocates the target logical VOL to this newly created virtual device 4 (S308). More specifically, the virtual device management program 15, for example, creates a new virtual device 4 by creating a device file in which is recorded an arbitrary virtual device ID that does not duplicate the virtual device ID of another virtual device 4. The virtual device ID recorded in this created device file constitutes the virtual device ID of the newly created virtual device 4. Next, the virtual device management program 15 configures the virtual device ID of this newly created virtual device 4 in the virtual device ID 164 of the target logical VOL 5. Further, the virtual device management program 15 configures the copy ID comprised in the control information read in S303 in the copy ID 162 of the target logical VOL 5.

Then, the virtual device management program 15 configures "P" in the Role information 165 of the target logical VOL 5 in the logical VOL management table 16 (S309).

Furthermore, when the host 1 comprises the virtual device management table 17, the virtual device management program 15 can register information related to the virtual device 4 that was newly created in S308 in the virtual device management table 17. More specifically, the virtual device management program 15 can register necessary information related to the target logical VOL 5 in the logical VOL management table 16 (for example, the virtual device ID, access storage information, and update time) in the virtual device management table 17 as information related to the virtual device 4. Furthermore, the access storage information of the target logical VOL 5, which is the primary VOL, is treated as the primary information of the virtual device 4. Thereafter, this process moves to S311.

In S311, a determination is made as to whether or not the processing of S301 through S310 has been implemented for all undefined logical VOL 5.

When processing has not been completed for all undefined logical VOL 5 (S311: NO), this process moves to S301.

Conversely, when processing has been completed for all undefined logical VOL 5 (S311: YES), the virtual device management program 15 determines whether or not there is a reserved logical VOL 5 (S312). More specifically, the virtual device management program 15 references the logical VOL management table 16, and determines whether or not there is a logical VOL 5 in which "reserved" is configured in virtual device ID 164.

'When there is no reserved logical VOL 5 (S312: NO), this process ends.

Conversely, when there is a reserved logical VOL 5 (S312: YES), the processing of S301 through S311 is carried out once again for the reserved logical VOL 5.

That is, one reserved logical VOL 5 is selected (S301), and a determination is made for the selected reserved logical VOL 5 (the target logical VOL 5 of the second processing) as to whether or not a logical VOL 5, which has the same copy ID as the copy ID comprised in the control information read in S303, is registered in the logical VOL management table 16 (S304). Furthermore, in the processing of S302 for the target logical VOL 5, a determination of "YES" is made the same as in the first processing (that is, it becomes S304: YES). Further, the virtual device management program 15 does not carry out the processing of S303 a second time when it is possible to reference the control information read in the first processing of S303.

Subsequent to the first processing related to the target logical VOL 5, this processing proceeds to S305 when the logical VOL 5, which has the same copy ID as the target logical VOL 5, is allocated to the newly created virtual device 4. In this case, the target logical VOL 5 is allocated to the virtual device 4 to which the logical VOL 5 with this same copy ID was allocated. The specific processing for the allocation is the same as was explained for the above-mentioned S305 and S306.

In cases other than those described hereinabove, this process moves to S310. Furthermore, in the processing of S307 for the target logical VOL 5, the determination is "NO" the same as the first processing (that is, it becomes S307: NO). In the second processing of S310, the virtual device management program 15 configures "undefinable" in the virtual device ID 164 of the target logical VOL 5 in the logical VOL management table 16. That is, the virtual device management program 15 decides that the target logical VOL 5 is a logical VOL 5, which cannot be allocated to the virtual device 4. This is because the target logical VOL 5 is a formatted secondary VOL, and must be allocated to an existing virtual device 4, but there is no logical VOL 5 having the same copy ID, and it is impossible to decide the virtual device 4 to which the target logical VOL 5 should be allocated.

When the second processing of S301 through S311 has been completed, the reserved logical VOL 5 ceases to exist, and this process ends.

Figure 15:
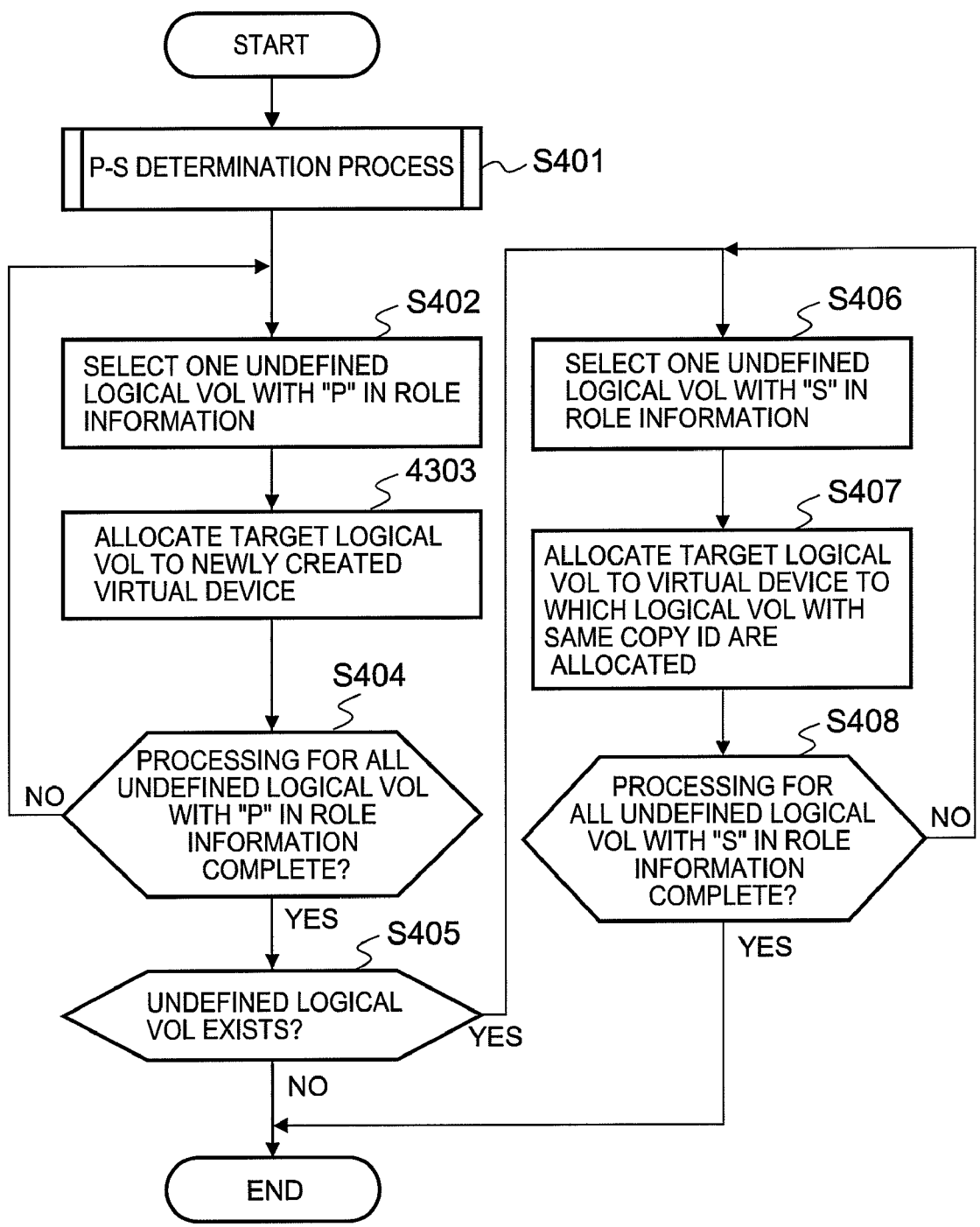
FIG. 15 is a flowchart of the process for allocating an unformatted undefined logical VOL to the virtual device.

FIG. 15 is a flowchart of the process for allocating an unformatted undefined logical VOL 5 to a virtual device 4.

This process corresponds to the processing of S105 of FIG. 12. Carrying out this process allocates an unformatted undefined logical VOL 5 to the virtual device 4. Furthermore, at the point in time when this process starts, all undefined logical VOL 5 are unformatted.

First, the virtual device management program 15 determines whether the undefined logical VOL 5 is a primary VOL or a secondary VOL (S401). Hereinafter, this determination process will be referred to as the "P-S determination process". Carrying out this process respectively formats the undefined logical VOL 5, and determines if the undefined logical VOL 5 are primary VOL or secondary VOL. This process will be explained in detail hereinbelow be referring to FIG. 16.

Next, the virtual device management program 15 references the logical VOL management table 16, and selects one undefined logical VOL 5 for which "P" is configured in the Role information 165 (in other words, the undefined logical VOL 5 is a primary VOL) (S402).

Then, the virtual device management program 15 creates a new virtual device 4, and allocates the undefined logical VOL 5 selected in S402 to this newly created virtual device 4 (S403). The specific processing of this allocation is the same as was explained for S308 of FIG. 14. That is, the virtual device management program 15, for example, creates the new virtual device by creating a device file in which is recorded an arbitrary virtual device ID that does not duplicate the virtual device ID of the other virtual devices 4. Then, the virtual device management program 15 configures the virtual device ID of this newly created virtual device 4 in the virtual device ID 164 of the undefined logical VOL 5 selected in S402. Then, the virtual device management program 15 configures the copy ID comprised in the control information read from the control area 6 of the undefined logical VOL 5 selected in S402 in the copy ID 162 of the undefined logical VOL 5 selected in S402.

Thereafter, the virtual device management program 15 determines whether or not the processing of S402 and S403 was implemented for all the undefined logical VOL 5, which are primary VOL (S404).

When processing for all the undefined logical VOL 5, which are primary VOL, has not been completed (S404: NO), this process moves to S402.

Conversely, when the processing for all the undefined logical VOL 5, which are primary VOL, has been completed (S404: YES), the virtual device management program 15 references the logical VOL management table 16, and determines if undefined logical VOL 5 still exist (S405).

When there are no more undefined logical VOL 5 (S405: NO), this process ends.

Conversely, when undefined logical VOL 5 still exist (S405: YES), this process proceeds to S406. Furthermore, the undefined logical VOL 5 detected at this point in time are secondary VOL. This is because the primary VOL undefined logical VOL 5, which were detected at the point when this process started, have been allocated to the virtual device 4 in S403, and are no longer undefined logical VOL 5.

In S406, the virtual device management program 15 references the logical VOL management table 16, and selects one undefined logical VOL 5 for which "S" is configured in the Role information 165 (that is, a secondary VOL).

Then, the virtual device management program 15 allocates the undefined logical VOL 5 selected in S406 to an existing virtual device 4 (S407). The specific processing of this allocation is the same as was explained for S305 of FIG. 14. That is, the virtual device management program 15 references the logical VOL management table 16, and acquires the virtual device ID 164 of the logical VOL 5, which has the same copy ID as the undefined logical VOL 5 selected in S406. Then, the virtual device management program 15 configures the above-mentioned acquired virtual device ID 164 in the virtual device ID 164 of the undefined logical VOL 5 selected in S406. Then, the virtual device management program 15 configures the copy ID comprised in the control information read from the control area 6 of the undefined logical VOL 5 selected in S406 in the copy ID 162 of the undefined logical VOL 5 selected in S406.

Thereafter, the virtual device management program 15 determines whether or not the processing of S406 and S407 has been implemented for all undefined logical VOL 5, which are secondary VOL (S408).

When processing has not been completed for all undefined logical VOL 5, which are secondary VOL (S408: NO), this process moves to S406.

Conversely, when processing has been completed for all undefined logical VOL 5, which are secondary VOL (S408: YES), this process ends.

Figure 16:
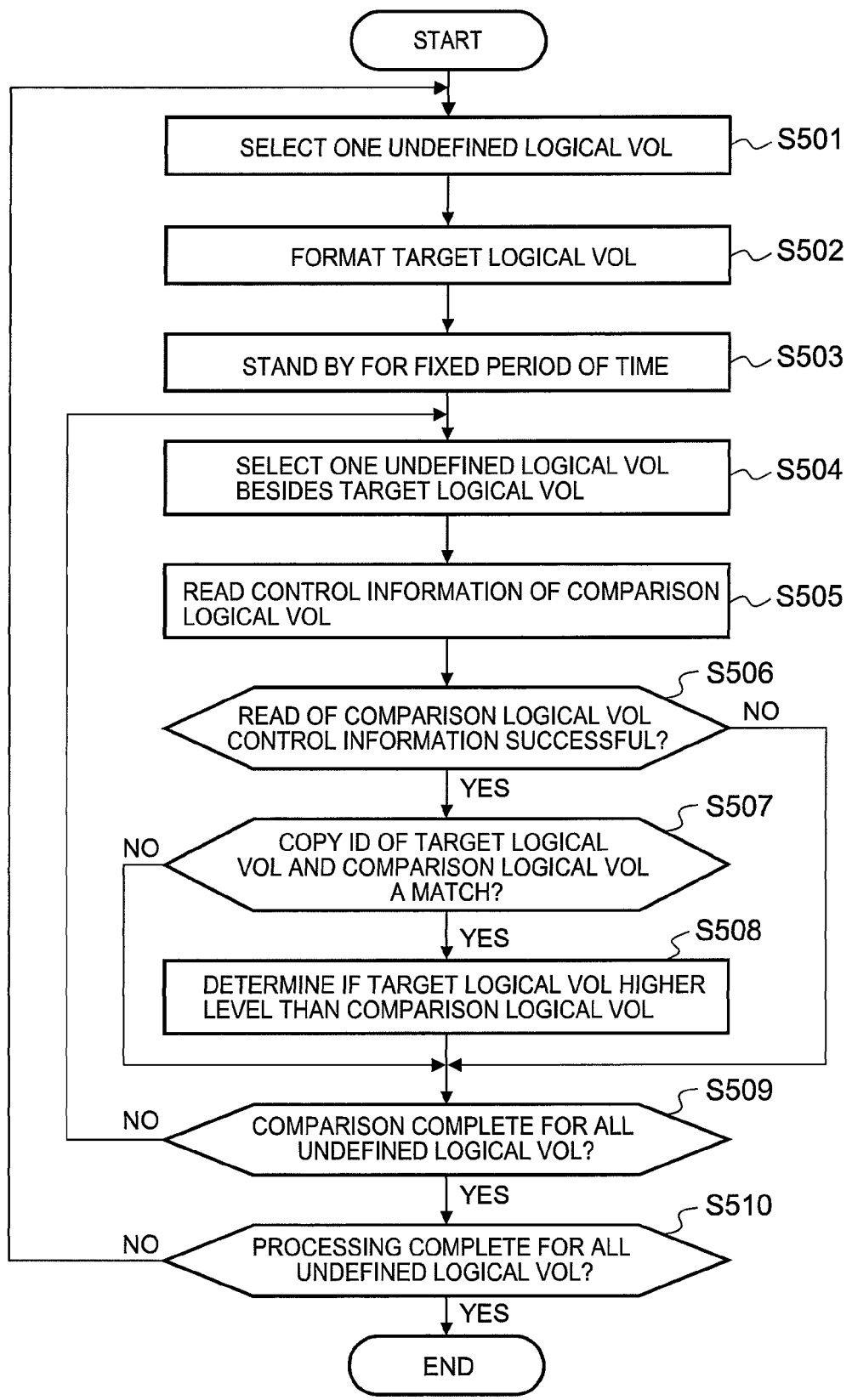
FIG. 16 is a flowchart of a P-S determination process.

FIG. 16 is a flowchart of a P-S determination process.

This process corresponds to the processing of S402 of FIG. 15. Carrying out this process determines whether an undefined logical VOL 5 is a primary VOL or a secondary VOL for all undefined logical VOL 5, which have not been formatted.

First, the virtual device management program 15 references the logical VOL management table 16, and selects one undefined logical VOL 5 (S501). Hereinafter, in the explanation of this process, this logical VOL 5 selected in S501 will be referred to as the "target logical VOL 5".

Next, the virtual device management program 15 carries out formatting for the target logical VOL 5 (S502). More specifically, the virtual device management program 15 issues to the storage system 2 a write request indicating that control information (for example, control information stored in fields as shown in FIG. 11) be written to a prescribed area of the target logical VOL 5 (the area used as the control area 6). Consequently, the target logical VOL 5 becomes a formatted logical VOL 5 having a control area 6, which is an area in which control information is written, and a data area 7, which is an area other than the control area 6.

Furthermore, the virtual device management program 15 can decide as follows the specific values of the control information written during this formatting. For example, the virtual device management program 15 can decide on an arbitrary ID, the copy ID of which does not duplicate the copy ID attached to the other logical VOL 5 (comprising ID written as control information, in addition to ID configured in the logical VOL management table 16). Further, the virtual device management program 15 sends the storage system 2 the above-mentioned command (for example, an inquiry command) for acquiring detailed information related to the LU 28 corresponding to the target logical VOL 5 in order to decide the default values of the primary information. Then, the virtual device management program 15 can use the information obtained by sending the command (vendor name, model name, serial number and LUN) to decide the default values of the primary information.

Next, the virtual device management program 15 transitions to standby for a fixed period of time (S503). It is supposed that the length of time of this standby (standby time) is a sufficient length of time for the data of the target logical VOL 5 to be copied to the lower-level logical VOL 5 thereof. More specifically, for example, this standby time is decided based on the configuration value (for example, the copy execution timing interval) related to the copy-set 8 (copy-set related to the logical VOL 5 of the host 1) formed in the storage system 2. For example, when a plurality of copy-sets 8 are formed in the storage system 2, the longest of the respectively configured copy execution timing intervals (or a length of time slightly longer than this copy execution timing interval) is used as this standby time. Therefore, when there is a logical VOL 5, which belongs to the same copy-set 8 as the target logical VOL 5, and which is located at a lower level than the target logical VOL 5, the data of the target logical VOL 5 is copied to this lower-level logical VOL 5 during this fixed-period standby.

Thereafter, the virtual device management program 15 selects one of the undefined logical VOL 5 besides the target logical VOL 5 (S504). Hereinafter, in the explanation of this process, this logical VOL 5 selected in S504 will be referred to as the "comparison logical VOL 5".

Then, the virtual device management program 15 reads control information from the control area 6 of the comparison logical VOL 5 (S505).

Then, the virtual device management program 15 determines if the read of the control information from the comparison logical VOL 5 in S505 succeeded or failed (S506). This process determines whether the comparison logical VOL 5 is formatted or not.

When the control information read has failed (that is, when the comparison logical VOL 5 is unformatted) (S506: NO), this process moves to S509.

Conversely, when the control information read has succeeded (that is, when the comparison logical VOL 5 is formatted), the virtual device management program 15 determines whether or not the copy ID of the target logical VOL 5 matches the copy ID of the comparison logical VOL 5 (S507).

When the copy ID of the target logical VOL 5 does not match the copy ID of the comparison logical VOL 5 (S507: NO), this process moves to S509.

Conversely, when the copy ID of the target logical VOL 5 matches the copy ID of the comparison logical VOL 5 (S507: YES), the virtual device management program 15 determines that the target logical VOL 5 is the logical VOL 5 located at a higher level than the comparison logical VOL 5, and stores information to that effect in memory (S508). This is because the data of the target logical VOL 5, which was formatted in S502, was copied to the comparison logical VOL 5 during the standby of S503.

The processing of S504 through S508 is carried out for the target logical VOL 5 with all the other undefined logical VOL 5 (S509).

Thereafter, the virtual device management program 15 determines whether or not the processing of S501 through S509 has been implemented for all undefined logical VOL 5 (S510).

When processing has not been completed for all undefined logical VOL 5 (S510: NO), this process moves to S501.

Conversely, when processing has been completed for all undefined logical VOL 5 (S510: YES), this process ends.

Subsequent to all P-S determination processing being completed, the virtual device management program 15 can learn the higher-level/lower-level relationships of all the undefined logical VOL 5 by combining all the information stored in the memory in S508 (the information showing which of two undefined logical VOL 5 is the higher-level logical VOL 5 and which is the lower-level logical VOL 5). Therefore, the virtual device management program 15 can specify whether an undefined logical VOL 5 is a primary VOL or a secondary VOL for all undefined logical VOL 5.

The preceding is an explanation of the process for allocating a logical VOL 5 to a virtual device 4. By carrying out a process like this, the virtual device management program 15 can use a storage system 2 function (the copy function of the copy-set 8) to allocate logical VOL 5, in which the data contents are kept the same, to the same virtual device 4.

Figure 17:
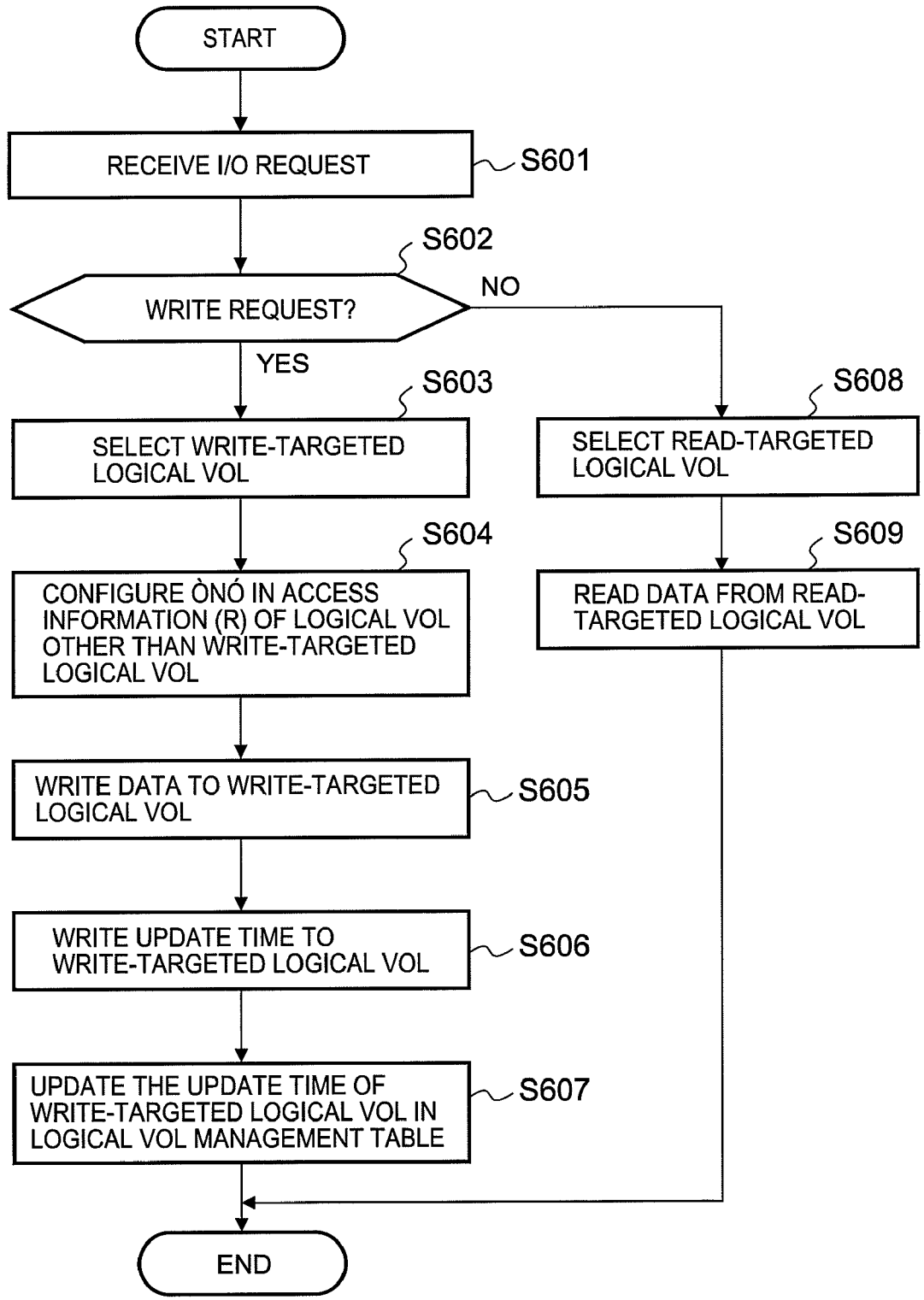
FIG. 17 is a flowchart of the process carried out by the virtual device management program when an I/O request is received.

FIG. 17 is a flowchart of the process carried out by the virtual device management program 15 when an I/O request has been received.

When an I/O request for a virtual device 4 is received from the application 13 (S601), the virtual device management program 15 determines if this I/O request is a write request or a read request (S602). Furthermore, the application 13, for example, can notify the virtual device management program 15 of the virtual device 4, which is the target of the I/O request (hereinafter, the "target virtual device 4") by issuing an I/O request and specifying a virtual device ID.

When the received I/O request is a write request (S602: YES), the virtual device management program 15 selects the logical VOL 5, which is the target of the write (hereinafter, the "write-targeted logical VOL 5") (S603). The virtual device management program 15 can make the write-targeted logical VOL 5 the primary VOL of the logical VOL 5 allocated to the target virtual device 4. More specifically, the virtual device management program 15 can reference the logical VOL management table 16, and select as the write-targeted logical VOL 5 that logical VOL 5, for which the same ID as the virtual device ID specified together with the I/O request is configured in the virtual device ID 164, and for which "P" is configured in the Role information 165.

Next, the virtual device management program 15 creates a state in which it is impossible to access logical VOL 5 other than the write-targeted logical VOL 5 allocated to the target virtual device 4. That is, in the logical VOL management table 16, the virtual device management program 15 configures "N" in the access information (R) 167 of logical VOL 5 other than the write-targeted logical VOL 5 allocated to the target virtual device 4 (S604).

Then, the virtual device management program 15 writes the write-targeted data received together with the I/O request in S601 to the write-targeted logical VOL 5 (S605).

Thereafter, the virtual device management program 15 overwrites the update time in the control area 6 of the write-targeted logical VOL 5 with the time at which the write was carried out in S605 (S606).

Thereafter, the virtual device management program 15 configures the time at which the write was carried out in S605 in the update time 166 of the write-targeted logical VOL 5 in the logical VOL management table 16 (S607). Thereafter, the write process ends.

Conversely, when the I/O request is a read request (S602: NO), the virtual device management program 15 selects the logical VOL 5, which is the target of the read (hereinafter, the "read-targeted logical VOL 5") (S603). The read-targeted logical VOL 5, for example, is the primary VOL of the logical VOL 5 allocated to the target virtual device 4. Further, in addition to the logical VOL 5, which is the above-mentioned primary VOL, the logical VOL 5 for which the same update time as the logical VOL 5, which is this primary VOL, is configured (a logical VOL 5 that is allocated to the target virtual device 4) can also be made the read-targeted logical VOL 5. This is because the logical VOL 5, which are allocated to the same virtual device 4, belong to the same copy-set 8, and if the update times are the same, then the data contents are also the same. That is, a plurality of read-targeted logical VOL 5 can also be selected.

Then, the virtual device management program 15 reads the read-targeted data specified in the I/O request of S601 from the read-targeted logical VOL 5 (S609). When a plurality of read-targeted logical VOL 5 have been selected, the virtual device management program 15, for example, can attempt to balance the load by simultaneously reading from the plurality of logical VOL 5 in accordance with a load balancing algorithm. Thereafter, the read process ends.

The preceding is an explanation of the process carried out by the virtual device management program 15 when an I/O request has been received. Carrying out a process like this prevents the host 1 from mistakenly sending a write request for a secondary VOL to the storage system 2. Further, since it is possible to simultaneous read out the same data contents from a plurality of logical VOL 5, the host 1 can carry out a read access at high speed.

Figure 18:
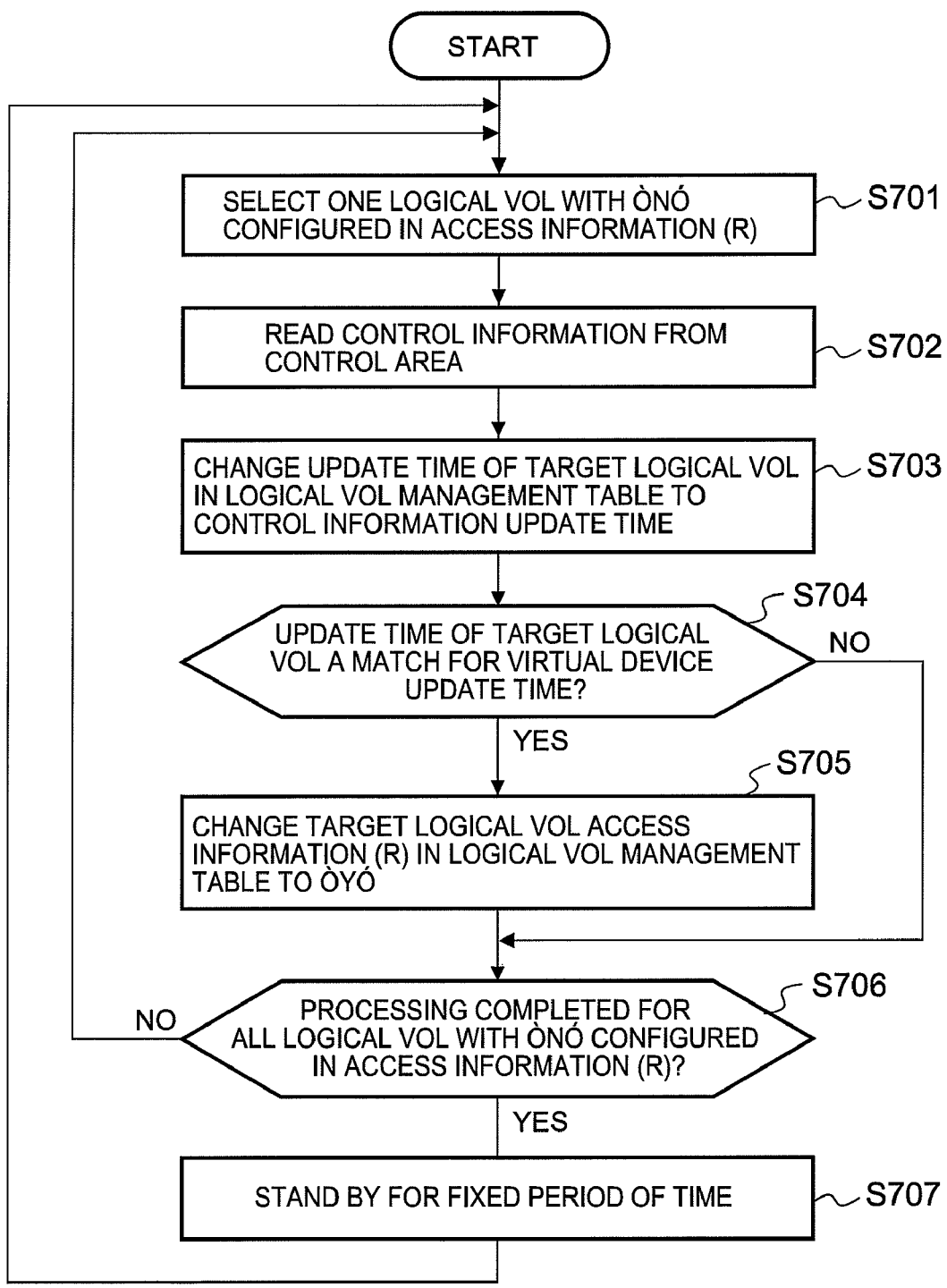
FIG. 18 is a flowchart of the process for updating the update time and access information in the logical VOL management table.

FIG. 18 is a flowchart of the process for updating the update time and access information in the logical VOL management table 16.

First, the virtual device management program 15 references the logical VOL management table 16, and selects one logical VOL 5 for which "N" is configured in the access information (R) 167 (S701). Hereinafter, in the explanation of this process, this logical VOL 5 selected in S701 will be referred to as the "target logical VOL 5".

Next, the virtual device management program 15 reads control information from the control area 6 of the target logical VOL 5 (S702).

Then, the virtual device management program 15 changes the update time 166 of the target logical VOL 5 in the logical VOL management table 16 to the update time comprised in the control information read in S702 (S703).

Thereafter, the virtual device management program 15 references the logical VOL management table 16, and determines whether or not the update time of the target logical VOL 5 matches the update time of the virtual device 4 to which this target logical VOL 5 is allocated (S704). As used here, virtual device 4 update time signifies the update time of the logical VOL 5, which is allocated to this virtual device 4, and which is the primary VOL. Therefore, more specifically, a determination is made as to whether or not the update time of the target logical VOL 5 matches the update time 166 of the logical VOL 5, for which the same virtual device ID as this target logical VOL 5 is configured in virtual device ID 164, and for which "P" is configured in Role information 165.

When the update time of the target logical VOL 5 does not match the update time of the virtual device 4 to which the target logical VOL 5 is allocated (S704: NO), this process moves to S706.

When the update time of the target logical VOL 5 matches the update time of the virtual device 4 to which the target logical VOL 5 is allocated (S704: YES), the virtual device management program 15 configures "Y" in the access information (R) 167 of the target logical VOL 5.

Thereafter, the virtual device management program 15 determines whether or not the processing of S701 through S705 has been implemented for all the logical VOL 5 for which "N" in configured in the access information (R) 167 (S706).

When processing has not been completed for all the logical VOL 5 for which "N" is configured in access information (R) 167 (S706: NO), this process moves to S701.

Conversely, when processing has been completed for all the logical VOL 5 for which "N" is configured in access information (R) 167 (S706: YES), the virtual device management program 15 transitions to standby for a fixed period of time (S707). Thereafter, this process moves to S701.

The preceding is an explanation of the process for updating the update time and access information in the logical VOL management table 16. By carrying out processing like this, the virtual device management program 15 is able to update to the latest values the information (update time and access information) referenced in the processing (processing of FIG. 17) carried out when an I/O request is received.

FIG. 19 is a diagram showing an example of a screen 9, which the virtual device management program 15 provides to the host 1 user.

This screen 9, for example, displays information useful for the user (for example, access information, update times, access storage information, and so forth) from among the information recorded in the logical VOL management table 16. In this screen 9, one row shows information related to one logical VOL 5. Then, in this screen 9, a display area is provided for each virtual device 4 so that it is clear to which virtual device 4 logical VOL 5 is allocated, and information related to the logical VOL 5 allocated to this virtual device 4 is displayed in the respective areas. For example, two virtual device 4 (ID "1" and ID "2") are shown in this figure. Then, it is clear from this figure that four logical VOL 5 are allocated to the virtual device 4 with the ID "1", and five logical VOL 5 are allocated to the virtual device 4 with the ID "2".

In this screen 9, for example, a change access button 10 is provided. The change access button 10 is used by the user to change the read-targeted logical VOL 5 in the virtual device 4. For example, pressing the change access button 10 changes the access value of the logical VOL 5, which was selected using the cursor 30. For example, pressing the change access button 10 causes the access value to change as follows: "W/R"→"W"→"W/R" or "R"→"-"→"R". Furthermore, these access values can also be linked to the values of the access information in the logical VOL management table 16. When these values are linked, changing an access value in the screen 9 causes the access information corresponding to the logical VOL management table 16 to be changed to the same access value. By utilizing the change access button 10, the user is not limited to the primary VOL of the virtual device 4, and can read data from an arbitrary logical VOL 5. That is, the user can also read data from a logical VOL 5 to which primary VOL data has yet to be copied, thereby making it possible to read past data as well.

The embodiment of the present invention described hereinabove is an example for explaining the present invention, and does not purport to limit the scope of the present invention solely to this embodiment. The present invention can be put into practice in a variety of other modes without departing from the gist thereof. For example, another type of update time information (for example, information expressing the passage of time from a certain point in time) can be employed instead of the update time.

What is claimed is:

1. A storage access device, which issues an I/O request (input/output request) to a logical unit provided by one or more storage systems, comprising:
logical volumes corresponding to the logical units respectively;
a volume manager for managing association information, which shows that a plurality of the logical volumes corresponding to a plurality of the logical units belonging to the same copy-set are associated;
a virtual device, to which the associated logical volumes shown by the association information are allocated respectively, and which is provided to an application; and
wherein the volume manager further manages, for each the logical volume, role information showing whether a logical volume corresponds to a primary volume or a secondary volume, and update time information showing the latest point in time at which the storage access device issued a write request to the logical volume,
the storage access device further comprising:
an I/O request issuer, which, when a read indication specifying the virtual device is received from the application, references the association information, role information, and update time information managed by the volume manager, selects from among the logical volumes allocated to the virtual device the logical volume corresponding to the primary volume and the logical volume holding the same update time information as the logical volume corresponding to the primary volume, and issues a read request to at least one of the selected logical volumes, and wherein
the primary volume is the logical volume corresponding to a primary logical unit;
the secondary volume is the logical volume corresponding to a secondary logical unit;
the primary logical unit is the logical unit, which constitutes a copy-source, but does not constitute a copy-destination in the copy-set; and
the secondary logical unit is the logical unit, which constitutes the copy-destination in the copy-set.

2. The storage access device according to claim 1, wherein the logical volume has a control area into which the update time information is written,
the storage access device further comprising:
an update time information updater, which reads out the update time information from the control area of the logical volume, and updates the update time information of the logical volume, which is managed by the volume manager, to the read-out update time information, and wherein
the I/O request issuer, upon receiving a write indication specifying the virtual device from the application, references the association information and role information managed by the volume manager, selects from among the logical volumes allocated to the virtual device the logical volume corresponding to the primary volume, issues a write request to the selected logical volume, updates the update time information related to the selected logical volume, which is managed by the volume manager, to the update time information showing the point in time at which the write request has been issued to the selected logical volume, and writes the updated update time information to the control area of the selected logical volume.

3. A storage access device, which issues an I/O request (input/output request) to a logical unit provided by one or more storage systems, comprising:
logical volumes corresponding to the logical units respectively;
a volume manager for managing association information, which shows that a plurality of the logical volumes corresponding to a plurality of the logical units belonging to the same copy-set are associated;
a virtual device, to which the associated logical volumes shown by the association information are allocated respectively, and which is provided to an application; and
wherein the logical volume has a control area in which is written identification information showing the copy-set to which the logical unit corresponding to the logical volume belongs,
the storage access device further comprising:
an identification information writer for writing the identification information to the control area of the logical volume;
an association information creator for reading out the identification information from the control area of the logical volume, and creating the association information that treats logical volumes, for which the read-out identification information is the same, as associated logical volumes; and a first role information creator, which, subsequent to writing identification information, which differs from any other identification information written to the logical volume, to the control area of one logical volume from among the logical volumes, reads out the identification information from control area of a comparison logical volume, which is the logical volume other than the one logical volume, and when the identification information written to the one logical volume matches the read-out identification information, creates the role information, which treats the comparison logical volume as the secondary volume.

4. A storage access device, which issues an I/O request (input/output request) to a logical unit provided by one or more storage systems, comprising:
  logical volumes corresponding to the logical units respectively;
  a volume manager for managing association information, which shows that a plurality of the logical volumes corresponding to a plurality of the logical units belonging to the same copy-set are associated;
  a virtual device, to which the associated logical volumes shown by the association information are allocated respectively, and which is provided to an application; and
  wherein the logical volume has a control area in which is written identification information showing the copy-set to which the logical unit corresponding to the logical volume belongs,
  the storage access device further comprising:
  an identification information writer for writing the identification information to the control area of the logical volume;
  an association information creator for reading out the identification information from the control area of the logical volume, and creating the association information that treats logical volumes, for which the read-out identification information is the same, as associated logical volumes; and
  wherein the volume manager further manages logical unit information related to the logical unit corresponding to the logical volume for each of the logical volumes,
  the storage access device further comprising:
  a logical unit information writer, which references the association information, role information, and logical unit information, and writes the logical unit information related to the logical volume, which is the primary volume associated to the logical volume, to the control area of the logical volume; and
  a second role information creator, which reads out the logical unit information from the control area of the logical volume, and when the logical unit information of the logical volume managed by the volume manager differs from the read-out logical unit information, creates the role information, which treats the logical volume as the secondary volume.

5. A non-transitory computer-readable medium embodying a computer program which is executed by a storage access device that maintains a logical volume corresponding to a logical unit provided by one or more storage systems,
  the computer program:
  creating association information showing that a plurality of logical volumes corresponding to a plurality of logical units, which belong to the same copy-set, are associated;
  allocating the respective associated logical volumes, shown by the association information, to a virtual device which is provided to an application;
  when a read indication specifying the virtual device is received from the application, referencing the association information and role information showing whether a logical volume corresponds to a primary volume or a secondary volume for each logical volume, and updating time information showing the latest point in time at which a write request has been issued to the logical volume;
  selecting from among the logical volumes allocated to the virtual device the logical volume corresponding to the primary volume, and the logical volume holding the same update time information as the logical volume corresponding to the primary volume; and
  issuing a read request to at least one of the selected logical volumes, and
  the primary volume being the logical volume corresponding to a primary logical unit;
  the secondary volume being the logical volume corresponding to a secondary logical unit;
  the primary logical unit being the logical unit, which constitutes a copy-source, but does not constitute a copy-destination in the copy-set; and
  the secondary logical unit is the logical unit, which constitutes the copy-destination in the copy-set.

6. The medium according to claim 5, the computer program further:
  reading out the update time information from a control area provided in the logical volume, and updating the update time information of the managed logical volume to the read-out update time information;
  referencing the association information and role information when a write indication specifying the virtual device is received from the application;
  selecting from among the logical volumes allocated to the virtual device the logical volume corresponding to the primary volume, and issuing a write request to the selected logical volume; and
  updating the update time information related to the selected logical volume, which is managed, to the update time information showing the point in time at which the write request has been issued to the selected logical volume, and writing the updated update time information to the control area of the selected logical volume.

7. A non-transitory computer-readable medium embodying a computer program, which is executed by a storage access device that maintains a logical volume corresponding to a logical unit provided by one or more storage systems,
  the computer program:
  creating association information showing that a plurality of logical volumes corresponding to a plurality of logical units, which belong to the same copy-set, are associated;
  allocating the respective associated logical volumes, shown by the association information, to a virtual device which is provided to an application;
  writing identification information, which shows the copy-set to which the logical unit corresponding to the logical volume belongs, to the control area of the logical volume;
  reading the identification information from the control area of the logical volume;
  creating the association information which treats logical volumes, for which the read-out identification information is the same, as associated logical volumes; and
  subsequent to writing identification information, which differs from any other identification information written to the logical volume, to the control area of one logical volume from among the logical volumes, reading out the identification information from the control area of a comparison logical volume, which is the logical volume other than the one logical volume, and when the identification information written to the one logical volume matches the read-out identification information, creating the role information treating the comparison logical volume as the secondary volume.

8. A non-transitory computer-readable medium embodying a computer program, which is executed by a storage access device that maintains a logical volume corresponding to a logical unit provided by one or more storage systems, the computer program:

creating association information showing that a plurality of logical volumes corresponding to a plurality of logical units, which belong to the same copy-set, are associated;

allocating the respective associated logical volumes, shown by the association information, to a virtual device which is provided to an application;

writing identification information, which shows the copy-set to which the logical unit corresponding to the logical volume belongs, to the control area of the logical volume;

reading the identification information from the control area of the logical volume;

creating the association information which treats logical volumes, for which the read-out identification information is the same, as associated logical volumes;

managing logical unit information related to the logical unit corresponding to the logical volume for each of the logical volumes, referencing the association information, role information, and logical unit information related to the logical unit corresponding to the logical volume;

writing the logical unit information related to the logical volume, which is the primary volume associated to the logical volume, to the control area of the logical volume;

reading out the logical unit information from the control area of the logical volume; and when the logical unit information of the logical volume, which is managed by the volume manager, differs from the read-out logical unit information, creating the role information, which treats the logical volume as the secondary volume.

* * * * *